US00RE44207E

(19) United States
(12) Reissued Patent
Schneider

(10) Patent Number: US RE44,207 E
(45) Date of Reissued Patent: *May 7, 2013

(54) NETWORK RESOURCE ACCESS METHOD, PRODUCT, AND APPARATUS

(75) Inventor: Eric Schneider, Delray Beach, FL (US)

(73) Assignee: ESDR Network Solutions LLC, Wilmington, DE (US)

( * ) Notice: This patent is subject to a terminal disclaimer.

(21) Appl. No.: 11/952,105

(22) Filed: Dec. 6, 2007

Related U.S. Patent Documents

Reissue of:
(64) Patent No.: 6,973,505
Issued: Dec. 6, 2005
Appl. No.: 09/644,587
Filed: Aug. 23, 2000

U.S. Applications:
(63) Continuation-in-part of application No. 09/643,584, filed on Aug. 22, 2000, now Pat. No. 7,010,568, and a continuation-in-part of application No. 09/598,134, filed on Jun. 21, 2000, now Pat. No. 6,895,430, and a continuation-in-part of application No. 09/532,500, filed on Mar. 21, 2000, now Pat. No. 7,136, 932.

(60) Provisional application No. 60/152,015, filed on Sep. 1, 1999, provisional application No. 60/153,594, filed on Sep. 13, 1999.

(51) Int. Cl.
*G06F 15/16* (2006.01)

(52) U.S. Cl.
USPC ..... 709/217; 709/223; 709/245; 709/228

(58) Field of Classification Search ..... 709/223, 709/217, 245
See application file for complete search history.

(56) References Cited

U.S. PATENT DOCUMENTS 4,155,042 A 5/1979 Permut et al.
4,190,800 A 2/1980 Kelly, Jr. et al.

(Continued)

FOREIGN PATENT DOCUMENTS

JP 54136617 10/1979
JP 11085492 3/1999

(Continued)

OTHER PUBLICATIONS

NTIA-DOC, RFC on the enhancement of the .us Domain Space, Aug. 4, 1998, from http:--www.ntia.doc.gov-ntiahome-domainname-usrfc-dotusrfc.htm.

(Continued)

*Primary Examiner* — Kenny Lin
(74) *Attorney, Agent, or Firm* — Fitch, Even, Tabin & Flannery, LLP

(57) ABSTRACT

When a user retrieves a web page from a network and it is determined that the web page can be accessed from the network with a resource location request including a Uniform Resource Identifier (URI) having one or more URI components, one or more domain names can be generated from at least one of a one or more URI components and at least a portion of the web page, and the user can be provided a copy of the web page from the network along with the ability to determine whether at least one domain name of said one or more domain names is available for registration.

71 Claims, 10 Drawing Sheets

U.S. PATENT DOCUMENTS

| | | | | |
|---|---|---|---|---|
| 4,196,310 | A | | 4/1980 | Forman et al. |
| 4,390,876 | A | | 6/1983 | Bjorklund et al. |
| 4,486,853 | A | | 12/1984 | Parsons |
| 4,754,326 | A | | 6/1988 | Kram et al. |
| 4,811,382 | A | | 3/1989 | Sleevi |
| 4,823,265 | A | | 4/1989 | Nelson |
| 4,903,206 | A | | 2/1990 | Itoh et al. |
| 4,956,771 | A | | 9/1990 | Neustaedter |
| 4,956,875 | A | | 9/1990 | Bernard et al. |
| 5,109,486 | A | | 4/1992 | Seymour |
| 5,155,837 | A | | 10/1992 | Liu et al. |
| 5,155,847 | A | | 10/1992 | Kirouac et al. |
| 5,175,681 | A | | 12/1992 | Iwai et al. |
| 5,231,570 | A | | 7/1993 | Lee |
| 5,249,230 | A | | 9/1993 | Mihm, Jr. |
| 5,249,275 | A | | 9/1993 | Srivastava |
| 5,319,699 | A | | 6/1994 | Kerihuel et al. |
| 5,321,740 | A | | 6/1994 | Gregorek et al. |
| 5,386,369 | A | | 1/1995 | Christiano |
| 5,402,490 | A | | 3/1995 | Mihm, Jr. |
| 5,404,231 | A | | 4/1995 | Bloomfield |
| 5,404,505 | A | | 4/1995 | Levinson |
| 5,418,951 | A | | 5/1995 | Damashek |
| 5,437,031 | A | | 7/1995 | Kitami |
| 5,444,823 | A | | 8/1995 | Nguyen |
| 5,446,891 | A | | 8/1995 | Kaplan et al. |
| 5,454,105 | A | | 9/1995 | Hatakeyama et al. |
| 5,500,561 | A | | 3/1996 | Wilhelm |
| 5,534,734 | A | | 7/1996 | Pugh et al. |
| 5,535,257 | A | | 7/1996 | Goldberg et al. |
| 5,544,036 | A | | 8/1996 | Brown, Jr. et al. |
| 5,572,438 | A | | 11/1996 | Ehlers et al. |
| 5,576,700 | A | | 11/1996 | Davis et al. |
| 5,592,620 | A | | 1/1997 | Chen et al. |
| 5,598,464 | A | | 1/1997 | Hess et al. |
| 5,600,778 | A | | 2/1997 | Swanson et al. |
| 5,603,034 | A | | 2/1997 | Swanson |
| 5,623,679 | A | | 4/1997 | Rivette et al. |
| 5,623,681 | A | | 4/1997 | Rivette et al. |
| 5,625,818 | A | | 4/1997 | Zarmer et al. |
| 5,634,016 | A | | 5/1997 | Steadham, Jr. et al. |
| 5,634,048 | A | | 5/1997 | Ryu et al. |
| 5,640,561 | A | | 6/1997 | Satoh et al. |
| 5,644,625 | A | | 7/1997 | Solot |
| 5,649,186 | A | | 7/1997 | Ferguson |
| 5,664,170 | A | | 9/1997 | Taylor |
| 5,673,252 | A | | 9/1997 | Johnson et al. |
| 5,684,710 | A | | 11/1997 | Ehlers et al. |
| 5,692,132 | A | | 11/1997 | Hogan |
| 5,696,695 | A | | 12/1997 | Ehlers et al. |
| 5,699,428 | A | | 12/1997 | McDonnal et al. |
| 5,701,399 | A | | 12/1997 | Lee et al. |
| 5,708,709 | A | | 1/1998 | Rose |
| 5,721,897 | A | | 2/1998 | Rubinstein |
| 5,742,818 | A | | 4/1998 | Shoroff et al. |
| 5,745,360 | A | | 4/1998 | Leone et al. |
| 5,761,083 | A | | 6/1998 | Brown, Jr. et al. |
| 5,761,689 | A | | 6/1998 | Rayson et al. |
| 5,764,906 | A | | 6/1998 | Edelstein et al. |
| 5,778,367 | A | | 7/1998 | Wesinger, Jr. et al. |
| 5,790,790 | A | | 8/1998 | Smith et al. |
| 5,802,524 | A | | 9/1998 | Flowers et al. |
| 5,812,776 | A | | 9/1998 | Gifford |
| 5,813,007 | A | | 9/1998 | Nielsen |
| 5,815,830 | A | | 9/1998 | Anthony |
| 5,835,087 | A | | 11/1998 | Herz et al. |
| 5,841,850 | A | | 11/1998 | Fan |
| 5,842,203 | A | | 11/1998 | D'Elena et al. |
| 5,848,396 | A | | 12/1998 | Gerace |
| 5,857,201 | A | | 1/1999 | Wright, Jr. et al. |
| 5,870,546 | A | | 2/1999 | Kirsch |
| 5,881,131 | A | | 3/1999 | Farris et al. |
| 5,890,172 | A | | 3/1999 | Borman et al. |
| 5,892,919 | A | | 4/1999 | Nielsen |
| 5,892,920 | A | | 4/1999 | Arvidsson et al. |
| 5,895,454 | A | | 4/1999 | Harrington |
| 5,898,836 | A | | 4/1999 | Freivald et al. |
| 5,907,680 | A | | 5/1999 | Nielsen |
| 5,908,467 | A | | 6/1999 | Barrett et al. |
| 5,913,215 | A | | 6/1999 | Rubinstein et al. |
| 5,926,116 | A | | 7/1999 | Kitano et al. |
| 5,933,604 | A | | 8/1999 | Inakoshi |
| 5,937,037 | A | | 8/1999 | Kamel et al. |
| 5,937,162 | A | | 8/1999 | Funk et al. |
| 5,940,847 | A | | 8/1999 | Fein et al. |
| 5,944,787 | A | | 8/1999 | Zoken |
| 5,949,419 | A | | 9/1999 | Domine et al. |
| 5,953,400 | A | | 9/1999 | Rosenthal et al. |
| 5,953,721 | A | | 9/1999 | Doi et al. |
| 5,963,205 | A | | 10/1999 | Sotomayor |
| 5,963,915 | A | | 10/1999 | Kirsch |
| 5,970,680 | A | | 10/1999 | Powers |
| 5,974,453 | A | | 10/1999 | Andersen et al. |
| 5,978,806 | A | | 11/1999 | Lund |
| 5,978,817 | A | | 11/1999 | Giannandrea et al. |
| 5,978,828 | A | | 11/1999 | Greer et al. |
| 5,978,842 | A | | 11/1999 | Noble et al. |
| 5,982,863 | A | | 11/1999 | Smiley et al. |
| 5,987,464 | A | | 11/1999 | Schneider |
| 5,987,508 | A | | 11/1999 | Agraharam et al. |
| 5,991,368 | A | | 11/1999 | Quatse et al. |
| 5,991,751 | A | | 11/1999 | Rivette et al. |
| 5,995,594 | A | | 11/1999 | Shaffer et al. |
| 5,999,907 | A | | 12/1999 | Donner |
| 5,999,912 | A | * | 12/1999 | Wodarz et al. ..... 705/14.61 |
| 6,003,061 | A | | 12/1999 | Jones et al. |
| 6,003,077 | A | | 12/1999 | Bawden et al. |
| 6,003,082 | A | | 12/1999 | Gampper et al. |
| 6,006,264 | A | | 12/1999 | Colby et al. |
| 6,006,265 | A | | 12/1999 | Rangan et al. |
| 6,009,150 | A | | 12/1999 | Kamel |
| 6,009,459 | A | * | 12/1999 | Belfiore et al. ..... 709/203 |
| 6,012,066 | A | | 1/2000 | Discount et al. |
| 6,014,660 | A | | 1/2000 | Lim et al. |
| 6,018,619 | A | | 1/2000 | Allard et al. |
| 6,018,768 | A | | 1/2000 | Ullman et al. |
| 6,021,433 | A | | 2/2000 | Payne et al. |
| 6,023,724 | A | | 2/2000 | Bhatia et al. |
| 6,029,195 | A | | 2/2000 | Herz |
| 6,032,150 | A | | 2/2000 | Nguyen |
| 6,038,601 | A | | 3/2000 | Lambert et al. |
| 6,041,324 | A | | 3/2000 | Earl et al. |
| 6,057,834 | A | | 5/2000 | Pickover |
| 6,058,250 | A | | 5/2000 | Harwood et al. |
| 6,058,355 | A | | 5/2000 | Ahmed et al. |
| 6,061,700 | A | | 5/2000 | Brobst et al. |
| 6,061,734 | A | | 5/2000 | London |
| 6,061,738 | A | | 5/2000 | Osaku et al. |
| 6,065,054 | A | | 5/2000 | Dutcher et al. |
| 6,085,242 | A | | 7/2000 | Chandra |
| 6,091,956 | A | | 7/2000 | Hollenberg |
| 6,092,100 | A | | 7/2000 | Berstis et al. |
| 6,094,665 | A | | 7/2000 | Lyons et al. |
| 6,097,108 | A | | 8/2000 | Tweed |
| 6,098,099 | A | | 8/2000 | Ellesson et al. |
| 6,104,582 | A | | 8/2000 | Cannon et al. |
| 6,104,990 | A | | 8/2000 | Chaney et al. |
| 6,105,098 | A | | 8/2000 | Ninose et al. |
| 6,119,153 | A | * | 9/2000 | Dujari et al. ..... 709/218 |
| 6,119,234 | A | | 9/2000 | Aziz et al. |
| 6,122,520 | A | | 9/2000 | Want et al. |
| 6,122,627 | A | | 9/2000 | Carey et al. |
| 6,125,361 | A | | 9/2000 | Chakrabarti et al. |
| 6,128,623 | A | | 10/2000 | Mattis et al. |
| 6,134,588 | A | | 10/2000 | Guenthner et al. |
| 6,137,873 | A | | 10/2000 | Gilles |
| 6,141,408 | A | | 10/2000 | Garfinkle |
| 6,141,653 | A | | 10/2000 | Conklin et al. |
| 6,148,289 | A | | 11/2000 | Virdy |
| 6,148,342 | A | | 11/2000 | Ho |
| 6,151,622 | A | | 11/2000 | Fraenkel et al. |
| 6,151,624 | A | | 11/2000 | Teare et al. |
| 6,154,600 | A | | 11/2000 | Newman et al. |
| 6,154,725 | A | | 11/2000 | Donner |
| 6,154,771 | A | | 11/2000 | Rangan et al. |
| 6,154,777 | A | | 11/2000 | Ebrahim |
| 6,157,292 | A | | 12/2000 | Piercy et al. |

6,167,389 A 12/2000 Davis et al.
6,167,449 A 12/2000 Arnold et al.
6,169,476 B1 1/2001 Flanagan
6,173,406 B1 1/2001 Wang et al.
6,181,787 B1 1/2001 Malik
6,181,985 B1 1/2001 O'Donnell et al.
6,182,148 B1 1/2001 Tout
6,182,227 B1 1/2001 Blair et al.
6,185,619 B1 2/2001 Joffe et al.
6,189,030 B1 2/2001 Kirsch et al.
6,195,691 B1 2/2001 Brown
6,198,511 B1 3/2001 Matz et al.
6,199,076 B1 3/2001 Logan et al.
6,202,087 B1 3/2001 Gadish
6,205,139 B1 3/2001 Voit
6,209,048 B1 3/2001 Wolff
6,212,565 B1 4/2001 Gupta
6,219,696 B1 4/2001 Wynblatt et al.
6,219,709 B1 4/2001 Byford
6,229,532 B1 5/2001 Fujii
6,230,168 B1 5/2001 Unger et al.
6,240,360 B1 5/2001 Phelan
6,240,555 B1 5/2001 Shoff et al.
6,249,817 B1 6/2001 Nakabayashi et al.
6,256,671 B1 7/2001 Strentzsch et al.
6,256,739 B1 7/2001 Skopp et al.
6,259,771 B1 7/2001 Kredo et al.
6,259,972 B1 7/2001 Sumic et al.
6,269,361 B1 7/2001 Davis et al.
6,282,511 B1 8/2001 Mayer
6,292,172 B1 9/2001 Makhlouf
6,292,709 B1 9/2001 Uhl et al.
6,297,819 B1 10/2001 Furst
6,298,327 B1 10/2001 Hunter et al.
6,298,341 B1 10/2001 Mann et al.
6,298,352 B1 10/2001 Kannan et al.
6,311,214 B1 10/2001 Rhoads
6,314,469 B1 11/2001 Tan et al.
6,321,222 B1 11/2001 Soderstrom et al.
6,321,242 B1 11/2001 Fogg et al.
6,324,538 B1 11/2001 Wesinger, Jr. et al.
6,324,585 B1 11/2001 Zhang et al.
6,324,650 B1 11/2001 Ogilvie
6,332,141 B2 12/2001 Gonzalez et al.
6,332,158 B1 12/2001 Risley et al.
6,338,082 B1 1/2002 Schneider
6,339,767 B1 1/2002 Rivette et al.
6,339,786 B1 1/2002 Ueda et al.
6,356,422 B1 3/2002 Bilac et al.
6,356,898 B2 3/2002 Cohen et al.
6,360,256 B1 3/2002 Lim
6,363,433 B1 * 3/2002 Nakajima ..... 709/313
6,366,298 B1 4/2002 Haitsuka et al.
6,366,906 B1 4/2002 Hoffman
6,381,627 B1 4/2002 Kwan et al.
6,381,651 B1 4/2002 Nishio et al.
6,385,620 B1 5/2002 Kurzius et al.
6,389,462 B1 5/2002 Cohen et al.
6,393,117 B1 5/2002 Trell
6,401,118 B1 6/2002 Thomas
6,405,243 B1 6/2002 Nielsen
6,412,014 B1 6/2002 Ryan
6,421,675 B1 7/2002 Ryan et al.
6,427,164 B1 7/2002 Reilly
6,430,623 B1 8/2002 Alkhatib
6,434,547 B1 8/2002 Mishelevich et al.
6,438,583 B1 8/2002 McDowell et al.
6,442,549 B1 8/2002 Schneider
6,442,602 B1 8/2002 Choudhry
6,449,657 B2 9/2002 Stanbach, Jr. et al.
6,452,609 B1 9/2002 Katinsky et al.
6,496,981 B1 12/2002 Wistendahl et al.
6,502,131 B1 12/2002 Vaid et al.
6,502,132 B1 12/2002 Kumano et al.
6,505,201 B1 1/2003 Haitsuka et al.
6,509,833 B2 1/2003 Tate
6,510,461 B1 1/2003 Nielsen
6,513,060 B1 1/2003 Nixon et al.
6,519,589 B2 2/2003 Mann et al.
6,526,402 B2 2/2003 Ling
6,532,366 B1 3/2003 Chung et al.
6,549,892 B1 4/2003 Sansone
6,556,992 B1 4/2003 Barney et al.
6,560,634 B1 * 5/2003 Broadhurst ..... 709/203
6,574,737 B1 6/2003 Kingsford et al.
6,578,078 B1 6/2003 Smith et al.
6,591,291 B1 7/2003 Gabber et al.
6,594,697 B1 7/2003 Praitis et al.
6,603,844 B1 8/2003 Chavez, Jr. et al.
6,604,132 B1 8/2003 Hitt
6,604,241 B1 8/2003 Haeri et al.
6,605,120 B1 8/2003 Fields et al.
6,606,659 B1 8/2003 Hegli et al.
6,608,891 B1 8/2003 Pelletier et al.
6,611,803 B1 8/2003 Furuyama et al.
6,615,237 B1 9/2003 Kyne et al.
6,615,247 B1 9/2003 Murphy
6,615,348 B1 9/2003 Gibbs
6,618,697 B1 9/2003 Kantrowitz et al.
6,618,726 B1 9/2003 Colbath et al.
6,628,314 B1 9/2003 Hoyle
6,636,854 B2 10/2003 Dutta et al.
6,636,961 B1 10/2003 Braun et al.
6,637,032 B1 10/2003 Feinleib
6,650,877 B1 11/2003 Tarbouriech et al.
6,654,741 B1 11/2003 Cohen et al.
6,654,746 B1 11/2003 Wong et al.
6,654,779 B1 11/2003 Tsuei
6,658,573 B1 12/2003 Bischof et al.
6,665,620 B1 12/2003 Burns et al.
6,668,278 B1 12/2003 Yen et al.
6,671,585 B2 12/2003 Lof et al.
6,671,714 B1 12/2003 Weyer et al.
6,671,738 B1 12/2003 Rajchel et al.
6,674,993 B1 1/2004 Tarbouriech
6,678,717 B1 1/2004 Schneider
6,691,105 B1 2/2004 Virdy
6,711,585 B1 3/2004 Copperman et al.
6,718,321 B2 4/2004 Birrell et al.
6,728,767 B1 4/2004 Day et al.
6,735,585 B1 5/2004 Black et al.
6,745,367 B1 6/2004 Bates et al.
6,748,375 B1 6/2004 Wong et al.
6,751,562 B1 6/2004 Blackett et al.
6,751,606 B1 * 6/2004 Fries et al. ..... 1/1
6,760,746 B1 7/2004 Schneider
6,760,770 B1 7/2004 Kageyama
6,766,369 B1 7/2004 Haitsuka et al.
6,779,178 B1 8/2004 Lloyd et al.
6,799,201 B1 9/2004 Lee et al.
6,826,617 B1 11/2004 Ansell et al.
6,829,653 B1 12/2004 Tout
6,836,805 B1 12/2004 Cook
6,850,940 B2 2/2005 Wesinger, Jr. et al.
6,880,007 B1 4/2005 Gardos et al.
6,892,226 B1 5/2005 Tso et al.
6,895,402 B1 5/2005 Emens et al.
6,895,430 B1 5/2005 Schneider
6,901,436 B1 5/2005 Schneider
6,931,451 B1 8/2005 Logan et al.
6,944,658 B1 9/2005 Schneider
6,959,339 B1 10/2005 Wu et al.
6,961,700 B2 11/2005 Mitchell et al.
6,963,928 B1 11/2005 Bagley et al.
6,973,505 B1 12/2005 Schneider
6,981,023 B1 12/2005 Hamilton et al.
6,990,678 B2 1/2006 Zigmond
7,000,028 B1 2/2006 Broadhurst et al.
7,003,442 B1 2/2006 Tsuda
7,003,719 B1 2/2006 Rosenoff et al.
7,010,568 B1 3/2006 Schneider et al.
7,013,298 B1 3/2006 De La Huerga
7,039,697 B2 5/2006 Bayles
7,039,708 B1 5/2006 Knobl et al.
7,069,323 B2 6/2006 Gardos et al.
7,080,158 B1 7/2006 Squire
7,089,194 B1 * 8/2006 Berstis et al. ..... 705/14.54
7,120,236 B1 10/2006 Schneider

| | | | | |
|---|---|---|---|---|
| 7,136,725 | B1 | 11/2006 | Paciorek et al. | |
| 7,136,932 | B1 | 11/2006 | Schneider | |
| 7,149,780 | B2 | 12/2006 | Quine et al. | |
| 7,188,138 | B1 | 3/2007 | Schneider | |
| 7,194,552 | B1 | 3/2007 | Schneider | |
| 7,225,249 | B1 * | 5/2007 | Barry et al. | 709/227 |
| 7,337,910 | B2 | 3/2008 | Cartmell et al. | |
| 7,359,987 | B2 | 4/2008 | Stahura | |
| 7,418,471 | B2 | 8/2008 | King et al. | |
| 7,472,160 | B2 | 12/2008 | King et al. | |
| 7,490,124 | B2 | 2/2009 | King et al. | |
| 7,543,026 | B2 | 6/2009 | Quine et al. | |
| 7,546,381 | B2 | 6/2009 | Tout | |
| 7,565,402 | B2 | 7/2009 | Schneider | |
| 7,606,858 | B2 | 10/2009 | King et al. | |
| 7,627,628 | B2 | 12/2009 | King et al. | |
| 7,752,260 | B2 | 7/2010 | King et al. | |
| 8,037,168 | B2 | 10/2011 | Schneider | |
| 8,224,994 | B1 | 7/2012 | Schneider | |
| 2001/0010032 | A1 | 7/2001 | Ehlers et al. | |
| 2001/0021947 | A1 | 9/2001 | Kim | |
| 2001/0047429 | A1 | 11/2001 | Seng et al. | |
| 2002/0010795 | A1 | 1/2002 | Brown | |
| 2002/0016174 | A1 | 2/2002 | Gibson et al. | |
| 2002/0023034 | A1 | 2/2002 | Brown et al. | |
| 2002/0024424 | A1 | 2/2002 | Burns et al. | |
| 2002/0059161 | A1 * | 5/2002 | Li | 707/1 |
| 2002/0065903 | A1 | 5/2002 | Fellman | |
| 2002/0069080 | A1 | 6/2002 | Roy et al. | |
| 2002/0069378 | A1 | 6/2002 | McLellan et al. | |
| 2002/0073233 | A1 | 6/2002 | Gross et al. | |
| 2002/0091703 | A1 | 7/2002 | Bayles | |
| 2002/0091827 | A1 | 7/2002 | King et al. | |
| 2002/0091836 | A1 | 7/2002 | Moetteli | |
| 2002/0103745 | A1 | 8/2002 | Lof et al. | |
| 2002/0129013 | A1 | 9/2002 | Thomas | |
| 2002/0156800 | A1 | 10/2002 | Ong | |
| 2002/0188699 | A1 | 12/2002 | Ullman et al. | |
| 2002/0194113 | A1 | 12/2002 | Lof et al. | |
| 2003/0009592 | A1 | 1/2003 | Stahura | |
| 2003/0014450 | A1 | 1/2003 | Hoffman | |
| 2003/0074672 | A1 | 4/2003 | Daniels | |
| 2003/0088708 | A1 | 5/2003 | Lewallen | |
| 2003/0098375 | A1 | 5/2003 | Shiga et al. | |
| 2003/0182447 | A1 | 9/2003 | Schilling | |
| 2003/0225670 | A1 | 12/2003 | DeCarlo, III | |
| 2004/0030759 | A1 | 2/2004 | Hidary et al. | |
| 2004/0044791 | A1 | 3/2004 | Pouzzner | |
| 2004/0088083 | A1 | 5/2004 | Davis et al. | |
| 2004/0107025 | A1 | 6/2004 | Ransom et al. | |
| 2005/0055306 | A1 | 3/2005 | Miller et al. | |
| 2005/0102354 | A1 | 5/2005 | Hollenbeck et al. | |
| 2005/0235031 | A1 | 10/2005 | Schneider | |
| 2006/0190623 | A1 | 8/2006 | Stahura | |
| 2006/0265516 | A1 | 11/2006 | Schilling | |
| 2008/0005342 | A1 | 1/2008 | Schneider | |
| 2008/0010365 | A1 | 1/2008 | Schneider | |
| 2008/0016142 | A1 | 1/2008 | Schneider | |
| 2008/0016233 | A1 | 1/2008 | Schneider | |
| 2008/0059607 | A1 | 3/2008 | Schneider | |
| 2008/0235383 | A1 | 9/2008 | Schneider | |

FOREIGN PATENT DOCUMENTS

| | | |
|---|---|---|
| JP | 11184667 | 7/1999 |
| JP | 11242682 | 9/1999 |
| JP | 11296428 | 10/1999 |
| WO | 9909726 | 2/1999 |
| WO | 9922488 | 5/1999 |
| WO | 9939275 | 8/1999 |
| WO | 0007133 | 2/2000 |

OTHER PUBLICATIONS

Oakes, C., Internet Keywords Patent Spat, Wired News, Jul. 22, 1999 from http:--www.wired.com-news-technology-0,1282,13892.00html.

Perez, Juan Carlos, Mozilla Launches Firefox 1.0, PCWORLD.com, Nov. 9, 2004 <http:--www.pcworld.com-news-article-0,aid,118537,00.asp>.

Advanced Control Systems, Inc.; Load Management; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.

American City Business Journal, Inc.; Blackout early warnings mandated; Apr. 3, 2001; USA; paragraphs 1, 2, 5, 6.

Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.

California, State of; Energy Action Plan; May 20, 2003; USA; p. 5, Section 1; pp. 7 & 8 Section V.

California Independent System Operator; California Independent System Operator Participant's whom have entered into an Interruptible Service Contract or similar agreement; California Independent System Operator (CAISO); Dec. 10, 2002; p. 1.

Desmond, J.; Customer Centric Alert and Resposne Program Overview; California Independent System Operator (CAISO); May 24, 2001; USA; pp. 2, 3, 4, 5, 6, 12, 13, 17, 18.

Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:--eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Oesterreichishe Gesellshaft Fur Unwelt Und Technik; iea-experts group on r&d priority setting and evaluation liberalisation of the electricity market; http:--www.oegut.at; Mar. 18, 2002; Austria (in English); pp. 4 (Sections 3 & 4), 7 Section 3), 8 (Controllable "Dispatchable" Loads; Section 2), 9 (Distributed Energy Resources).

O'Neil, E.; Cumulative Totals of No-Touch, Restricted Maintenance Operations, Alert, Warning, Emergency and Power Watch Notices Issued from 1998 to Present; California Independent System Operator (CAISO); May 29, 2003; USA; p. 4, Table; p. 5, Table; p. 6, Table; p. 7, Table; p. 8, Table; p. 9, Table; p. 10, Table; p. 11, Table; p. 11, Table; p. 12, Table; p. 14, Table.

Perez, Pena, R.; Utility Could Have Halted '03 Blackout, Panel Says; New York Times; http:--www.nytimes.com-2004-0406-national-06BLAC.html; Apr. 6, 2004; USA; paragraphs 1, 2, 3, 4, 9.

Purdum, T.; Statewide Blackouts Ordered as Heat Strains California Grid; New York Times; May 8, 2001; USA; paragraphs 3, 4, 5, 8, 9.

United States of America, Federal Energy Regulation Commission; National Transmission Grid Study, Consolidated List of Recommendations; FERC; May 6, 2002, USA; pp. 2-76 & 3-77 Section 4, 5-79 Section 5.

Weiss, J.; EPRI's Enterprise Infrastructure EPRI's Enterprise Infrastructure Security (EIS) Program Security (EIS) Program; Jul. 7, 2000; USA, pp. 2 through 24.

Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:--certs.lbl.gov.; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.

Werst, K.L., Why Rotating Outages?; California Independent System Operation (CAISO); Aug. 17, 2001; USA; paragraphs 1, 2, 3, 5, 6, 7.

Donaghy, Melanie, "Wines & Vines," Sep. 1997, vol. 78, No. 9, p. 39(6).

FAX-Phone Switch for Multi-Ring Telephone Lines; Derwent Abstract; Jul. 1992.

Schneider, Eric; Claims from Pending U.S. Appl. No. 11/687,672.

Schneider, Eric; Claims from Pending U.S. Appl. No. 10/711,834.

Schneider, Eric; Claims from Pending U.S. Appl. No. 12/044,804.

Schneider, Eric; Claims from Pending U.S. Appl. No. 12/109,608.

Motegi, N., Piette, MA.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.
Norman, J.; Southern Telecom and Main.net Announce Successful Demonstration of Broadband over Power Lines; Southern Telecom; Dec. 2003; p. 1.
Wired News Report, The Postal Proposal, Wired News, May 8, 1999 from http:--www.wired.com-news-technology-0,1282.131-30,00.html.
Wired News Report, Depp Space Web?, Wired News, Jul. 22, 1999 from http:--www.wired.com-news-technology-0,1282,139-09,00.html.
Singhal, Vigyan and Smith, Alan Jay, "Analysis of locking behavior in three real database systems," 1997, The VLDB Journal, vol. 6, pp. 40-52.
Oakes, Chris, "Net Sol, ICANN Reach Accord," Wired News, from wired.com-news-politics-0,1283,31557,00.html, Sep. 29, 1999, pp. 1-3.
Web Page of Network Solutions.
www.phonetic.com; Internet print-out; Wayback Machine.
Courter, Gini; Microsoft Office 2000 Professional Edition, 1999, Sybex, pp. 92-96, 254-257.
"What Words are Hiding in Your Phone Number?" Internet print-out of www.dialabc.com; Wayback Machine.
Graves, K.; CAISO Summer 2001 Assessment; California Independent System Operator (CAISO); Mar. 22, 2001; USA; p. 29, paragraphs 1 & 2, p. 30, paragraphs 1, 2, Figure III-E.
Graves, K.; CAISO Feb. 2001 Winter Assessment and Summer 2001 Post-season Summary; California Independent System Operator (CAISO); Oct. 8, 2001; USA; pp. 17 & 18, Section IV.
Gross, G.; FCC moves ahead with powerline broadband rules; IDG News Service; Feb. 13, 2004; USA; paragraphs 1, 2, 6, 9.
Guardino; Board of Governors; Notification Plan 2; California Independent System Operator (CAISO); May 21, 2001; USA.
Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.
Jonker, R.; Dijak, P.; Enabling Distributed Generation and Demand Response with Enterprise Energy-Management Systems; Darnell.com Inc.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.
Keoni, A.; California Independent System Operator Load Program Participants; California Independent System Operator (CAISO); Apr. 8, 2002; pp. 1, 2, 3.
Keoni, A.; Implementation Plan and Required Information for the Partipating Load Program (PLP); California Independent System Operator (CAISO); Aug. 8, 2002; USA; p. 1, paragraphs 2 & 3; p. 2, paragraphs 1 & 2, Table 1.
Labaton, S., F.C.C. Begins Rewriting Rules on Delivery of the Internet; Associated Press; Feb. 13, 2004; USA; paragarphs 1, 2, 6, 7.
Lyon, D.; The Development of Electric System Emergencies and the Emergency Response Communication Network: White Paper; California Independent System Operator (CAISO); Jun. 20, 2001; USA; p. 2, paragraphs 1 & 4; p. 3, paragraph 1 & Section II; pp. 6, 7, 8, 9; pg. 10, Section III, paragraphs 1, 2, 3; p. 11, paragraphs 2 & 3; p. 12, paragraph 1; p. 13, paragraph 4, p. 14.
Hollenbeck et al., "Domain Name System Wildcards in Top-Level Domain Zones", VeriSign Naming and Directory Services, VeriSign, Inc., Sep. 9, 2003.
Ohta, "Incremental Zone Transfer in DNS", RFC 1995, Aug. 1996.
Vixie et al., "Dynamic Updates in the Domain Name System (DNS Update)", RFC 2136, Apr. 1997.
Request for Comment (RFC) 2276, Architecture Principles of Uniform Resource Name Resolution, Sollins, Jan. 1998; pp. 1-24.
Berners, Lee T.; "RFC1630: Universal Resource Identifiers in WWW—A Unifying Syntax for the Expression of Names and Addresses of Objects on the Network as used in the World Wide Web", IETF, Jun. 1994; http:--www.faqs.org-rfcs-rfc1630.html.
Mockapetris P., "RFC 1035: Domain Names-Implementation and Specification", IETF, Nov. 1987, http:--www.faqs.org-rfcs-rfc1035.html.
Harrenstien, et al.; "RFC954: Nicname-Whois", IETF, Oct. 1985, http:--ww.faqs.org-rfcs-rfc954.html.
Mockapetris, Request for Comment (RFC) 1034, Domain Names-Concepts and Facilities, Section 4.3.3, IETF, Nov. 1987, pp. 1-55.
Request for Comment (RFC) 1480, The US Domain; Cooper & Postel, Jun. 1993, pp. 1-47.
Samson, M., PGMedia, Inc. d-b-a Name.Space TM, v. Network Solutions, Inc., et al., Mar. 1999, pp. 1-2.
Liberto, S.M., Domain Name Conflicts: Hey! That's My.Com!, WWWiz Magazine, Mar. 1998, pp. 1-3.
Cabell, D., Learning Cyberlaw in Cyberspace, Name Conflicts, Berkman Center for Internet & Society, Harvard Law Schol, Aug. 1999, pp. 1-21.
Goodin, D., CNET News.com: NSI domain slowdown persists, Jan. 1999, pp. 1-4.
Goodin, D., CNET News.com: NSI confirms database revisions, Jan. 21, 1999, pp. 1-2.
Northrup, T., Windows IT Library: Domain Name Services, Jul. 1998, pp. 1-41.
Press Release, "OINGO Pioneers New Domain Name Variation Technology", May 17, 2000; http:--www.namingsolutions.com-ns_new_pr_51700.hmtl.
Statement of the policy oversign committee, The Economic Structure of Internet Generic Top-Level Domain Name Registries Analysis and Recommendations, Jul. 23, 1998.
Crow, R., the Telephone Exchange Name Project, Web Site (1998), from http:--ourwebhome.com-TENP-TENproject.html.
NTIA-DOC, Improvement of Technical Management of Internet Names and Addresses, Federal Register V63 N34, Feb. 20, 1998, from http:--www.ntia.doc.gov-ntiahome-domainname-022098fedreg.httm.
Berners-Lee, T. et al., Uniform Resource Identifiers (URI): General Syntax; Network Working Group, Aug. 1988.
Network Solutions and VeriSign Launch Combined Internet Name and Certification Registration, Internet World. Mar. 10, 1997.
Network Solutions, Inc., Online Team up to Server Internet Needs of Small Business Owners, Jan. 1998, pp. 1-2.
Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; p. 4, paragraph 4 & 5; p. 5; p. 6, paragraph 1, p. 7; p. 8.
What does your phone number spell?. Home page of www.phonespell.com; Wayback Machine, 1996.
Network Working Group, Uniform Resource Identifiers (URI): General Syntax by T. Berners-Lee et al, Aug. 1998.*

* cited by examiner

NETWORK RESOURCE ACCESS METHOD, PRODUCT, AND APPARATUS

Matter enclosed in heavy brackets [ ] appears in the original patent but forms no part of this reissue specification; matter printed in italics indicates the additions made by reissue.

CROSS REFERENCE TO RELATED APPLICATIONS

The application for patent claims priority of U.S. Provisional Application Ser. No. 60/153,594 filed Sep. 13, 1999, by Schneider and U.S. Provisional Application Ser. No. 60/152,015 filed Sep. 1, 1999, by Schneider, et al., which are hereby incorporated by reference[.]*;*

[The] *this* application for patent is also [related to co-pending applications and claims the benefit] *a continuation-in-part* of U.S. patent application Ser. No. 09/643,584 filed Aug. 22, 2000, by Schneider, et al., *now U.S. Pat. No. 7,010,568; this application for patent is also a continuation-in-part of* U.S. patent application Ser. No. 09/598,134 filed Jun. 21, 2000, by Schneider, [and] *now U.S. Pat. No. 6,895,430; and this application for patent is also a continuation-in-part of* U.S. patent application Ser. No. 09/532,500 filed Mar. 21, 2000, by Schneider, *now U.S. Pat. No. 7,136,932,* which are hereby incorporated by reference.

FIELD OF THE INVENTION

This invention generally relates selecting online advertisements, and more specifically relates to a method, product, and apparatus for using a URI component to select and provide advertising, search terms, and available identifiers.

BACKGROUND OF THE INVENTION

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which may be used as a query to access a database server and generate an HTML web page with customized data results as output that is passed back to the client browser for display.

The Web is a means of accessing information on the Internet that allows a user to "surf the web" and navigate Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is available on a wide range of computer platforms including PC's.

A Uniform Resource Identifier (URI) is a compact string of characters for identifying an abstract or physical resource. URIs, is the generic set of all names and addresses that refer to objects on the Internet. URIs that refer to objects accessed with existing protocols are known as URLs. A URL is the address of a file accessible on the Internet. The URL contains the name of the protocol required to access the resource, a domain name, Fully Qualified Domain Name (FQDN), or IP address that identifies a specific computer on the Internet, and a hierarchical description of a file location on the computer. In addition, the last (optional) part of the URL may be a "?" followed by a query string having name/value pairs for parameters (e.g. "?size=small&quantity=3") or a "#" followed by a fragment identifier indicating a particular position within the specified document.

The URI "http://www.example.com:80/index.html#appendix" is the concatenation of several components where "http:" is the scheme or protocol, "//www.example.com" is the FQDN having "www" as the host of the domain name "example.com", ":80" is the port connection for the HTTP server request, "index.html" is the filename located on the server, "#appendix" is the identifier to display a fragment of the HTML file called "index". The URL "http://www.example.com" also retrieves an HTML file called "index" on a HTTP server called "example.com". By default, when either a port or filename is omitted upon accessing a HTTP server via a URL, the client browser interprets the request by connecting via port 80, and retrieving the HTML file called "index".

A domain name consists of two parts: a host and a domain. Technically, the letters to the right of the "dot" (e.g., tut.net) are referred to as Top Level Domains (TLDs), while hosts, computers with assigned IP addresses that are listed in specific TLD registries are known as second-level domains (SLDs). For the domain name "tut.net", ".net" is the TLD, and "tut" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "king-.tut.net", are subsidiary to TLDs in the hierarchy of the Internet's DNS.

URLs are used in media and written in documents or typed within e-mail, and data files, etc. as a means to make reference to online content that helps express the context of the ideas one wishes to communicate. URLs are generally written in an abbreviated manner as partial URLs or domain names (e.g., "http://www.example.com" is the URL, "www.example-.com" is the FQDN, and "example.com" is the domain name). During the early stages of commercialization on the Internet, businesses displayed the full URL when advertising a commercial or display ad as a means to locate such resources on the Internet.

Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com". Though a helpful mnemonic for consumers to more readily identify and access the location and origin of goods and services on a public network such as the Internet, the mnemonic is only applicable when using a command line of a device or location field of a web browser program as a means to access the advertised web site.

U.S. Provisional Application Ser. No. 60/143,859 filed Jul. 15, 1999, by Schneider entitled "Method and apparatus for generation, registration, resolution, and emulation of name space", now abandoned, uses a domain name having a top level domain alias (TLDA) to simultaneously access and search a given resource demonstrating the combination of both resolution and search services. For instance, when input is received and processed such as "http://example.44106", steps are performed to determine that ".44106" is not a resolvable TLD and may be processed instead as a search term. Steps may then be performed to translate input into a valid URI such as "http://example.com/weather.cgi?zip=44106". When the URI is accessed, a CGI script called "weather" is executed passing the value "44106" for the name "zip", which in this case represents a zip code. By so doing a fictitious name may be used to simultaneously access both a resource and search request.

U.S. Provisional Application Ser. No. 60/152,015 filed Sep. 1, 1999, by Schneider, et al., entitled "Method and apparatus for using a portion of a URI as a search request." generates a shorter URI on the fly as a substitute for longer URIs that reflect the results of queries or search requests. For instance, when "http://update.to/news" is received as input it may be determined that no such URI exists and, in response, create the URI on the fly as a means to access content from a longer URI such as:
"http://update.to/cgi-bin/update.cgi?search=news".

This clearly demonstrates the need for methods of encouraging the creative use of URIs to access resources. Accordingly, in light of the above, there is a strong need in the art for a system and method to improve how resources and content including advertising, search terms, and available identifiers may be accessed.

SUMMARY OF THE INVENTION

Briefly, the present invention allows portions of a URI to be used as a search request for advertising selection. The invention allows for coupons, rebates, offers and advertising to de displayed or printed in response to keywords extracted from a URI or meta content corresponding with the page source of such a URI. The present invention displays keywords extracted from Meta or Title information to assist a user or subscriber with search terms to help form a query or search request. The invention also displays available identifiers such as domain names in addition to the displayed search terms. The present invention allows for keywords used as a search request to be further used as path names to generate a shorter URI on the fly in real time rather than displaying such search results from a longer URI. The invention further uses extracted keywords to display advertising that represents competition to the received URI. The present invention reduces the extra steps of remembering or typing and possibly misspelling a recipient address, by combining the functions of sending e-mail by only typing in a URI. The invention enables the user to combine Boolean logic with valid URI notation to generate a search request from the URI or vice-versa.

In general, in accordance with the present invention a method for locating a network resource from a first identifier having a valid accessible first URI includes the steps of parsing at least one URI component from the first URI, selecting a first content corresponding to said at least one URI component of the first URI, generating a valid accessible second URI that accesses said first content, and accessing the first URI and said second URI.

In accordance with another aspect of the present invention a method for processing a search request having at least one keyword, wherein the search results of the search request is accessed from an accessible first URI having a query component that corresponds to the at least one keyword includes the steps of generating a second URI having a default file that accesses the first URI and a non-query component that corresponds to the at least one keyword, and accessing said second URI.

In accordance with yet another aspect of the present invention a method for sending a message to an e-mail address includes the steps of accessing an accessible first URI, wherein said first URI is not an e-mail address, submitting the message to be sent from said first URI, generating the e-mail address from said first URI in response to submitting the message, and sending the message to the generated e-mail address.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

Figure 1A:
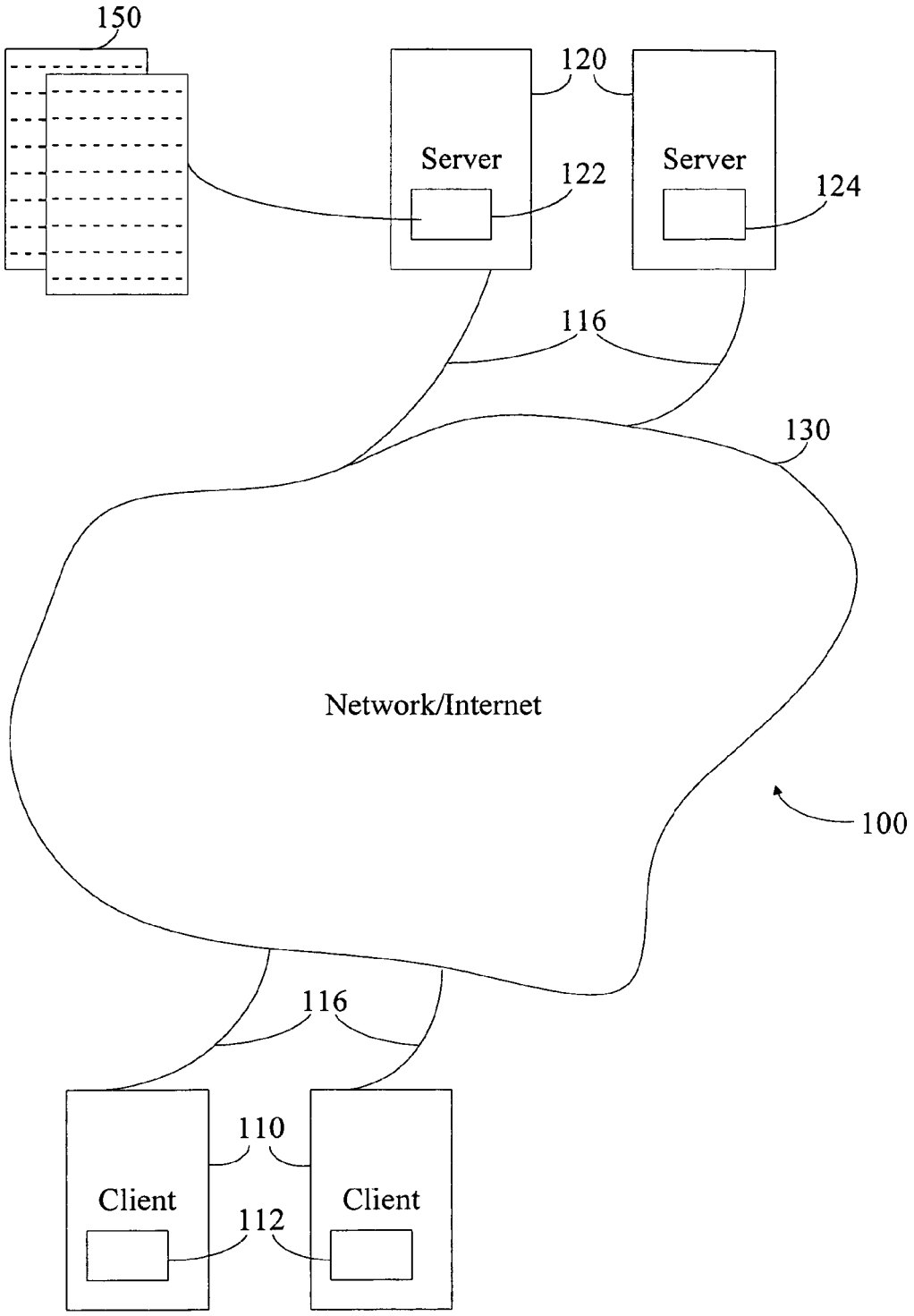
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow clients 110 to communicate with servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
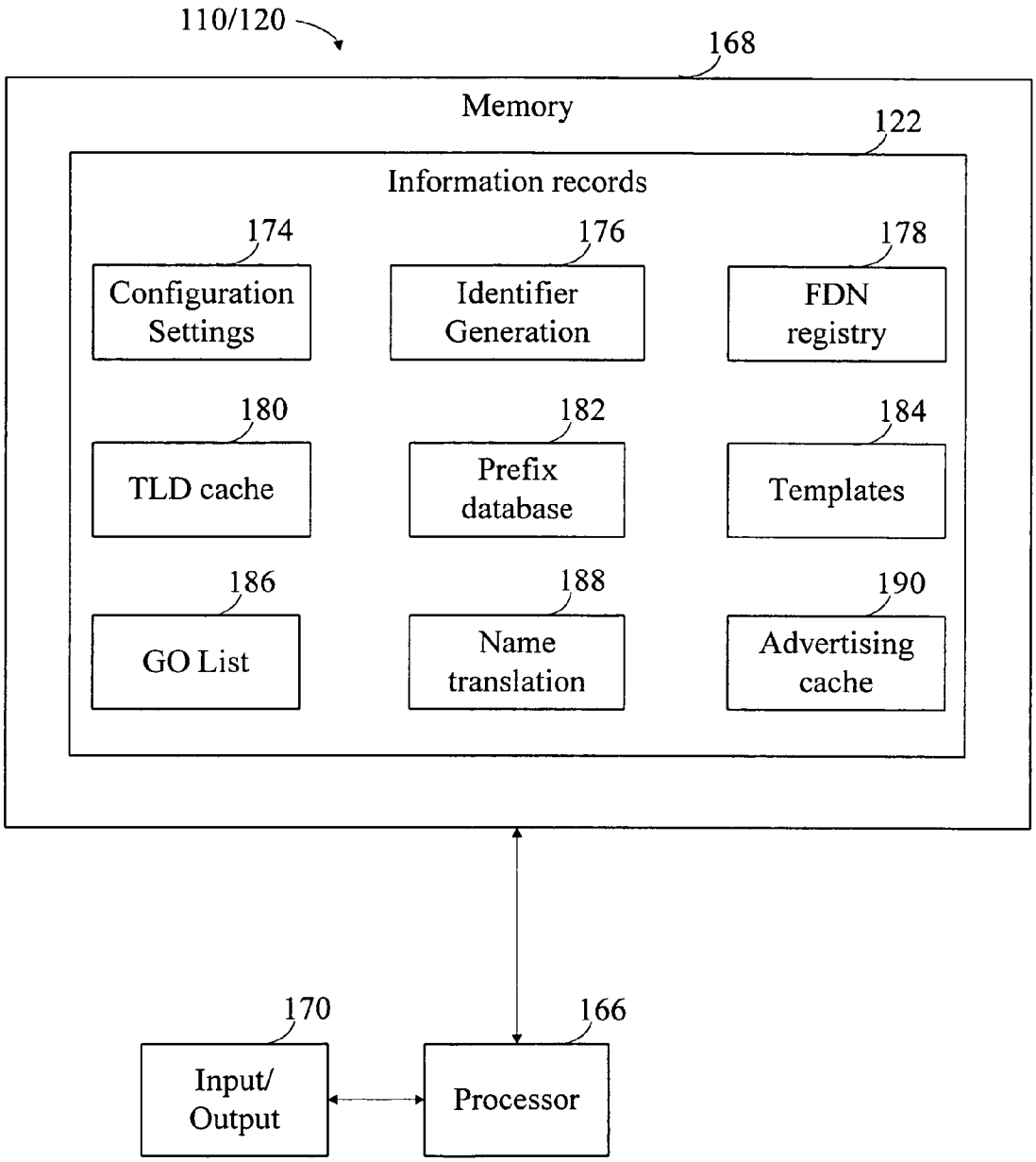
FIG. 1b is a block diagram illustrating exemplary information records stored in memory in accordance with the present invention.

FIG. 1b illustrates a block diagram of a processor 166 coupled to a storage device such as memory 168 and to input/output devices 170 in a client 110 and/or server 120 computing system. Stored in memory 168 may be information records 122 having any combination of exemplary content such as lists, files, and databases. Such records may include for example: user modifiable configuration settings 174, identifier generation routines 176, FDN registry 178, TLD cache 180, prefix database 182, Templates 184, GO List 186, name translation table 188, and advertising cache 190. These information records may be further introduced and discussed in more detail throughout the disclosure of this invention.

Figure 2:
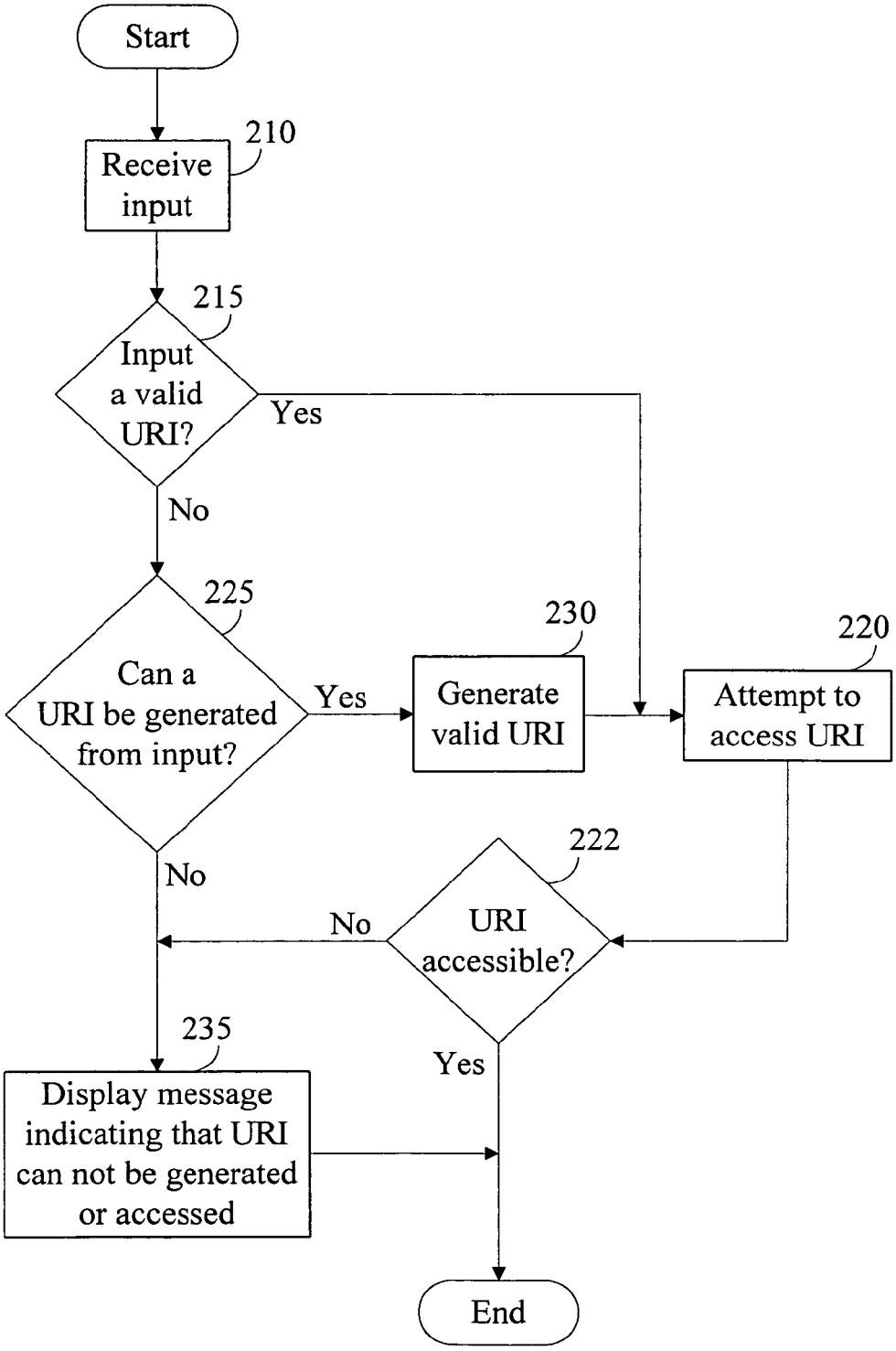
Prior Art Fig. 2
FIG. 2 is a flowchart illustrating the steps performed by a prior art system for accessing a URI.

FIG. 2 is a flowchart illustrating the steps performed by a prior art system for locating a network resource from an identifier by accessing a URI. A device such as a network access apparatus 110, servlet, applet, stand-alone executable program, or user interface element such as a text box object, command line, speech to text interface, location field 814 of a web browser 112, may receive and parse input such as text or voice in step 210. It then may be determined in step 215 whether the input 210 is a URI. If the input is a URI, then an attempt may be made in step 220 to access the URI. The URI may be accessed when it is determined in step 222 that the URI is accessible. If the input is not a URI, then it may be determined in step 225 whether a URI can be generated from the input (e.g., if a scheme is missing the prefix "http://" or another scheme prefix may be concatenated to input). If so, then a URI is generated 230 and an attempt may be made in step 220 to access the URI. If the URI can not be generated or accessed, then a message indicating that the URI can not be generated or accessed may be displayed in step 235.

Figure 3:
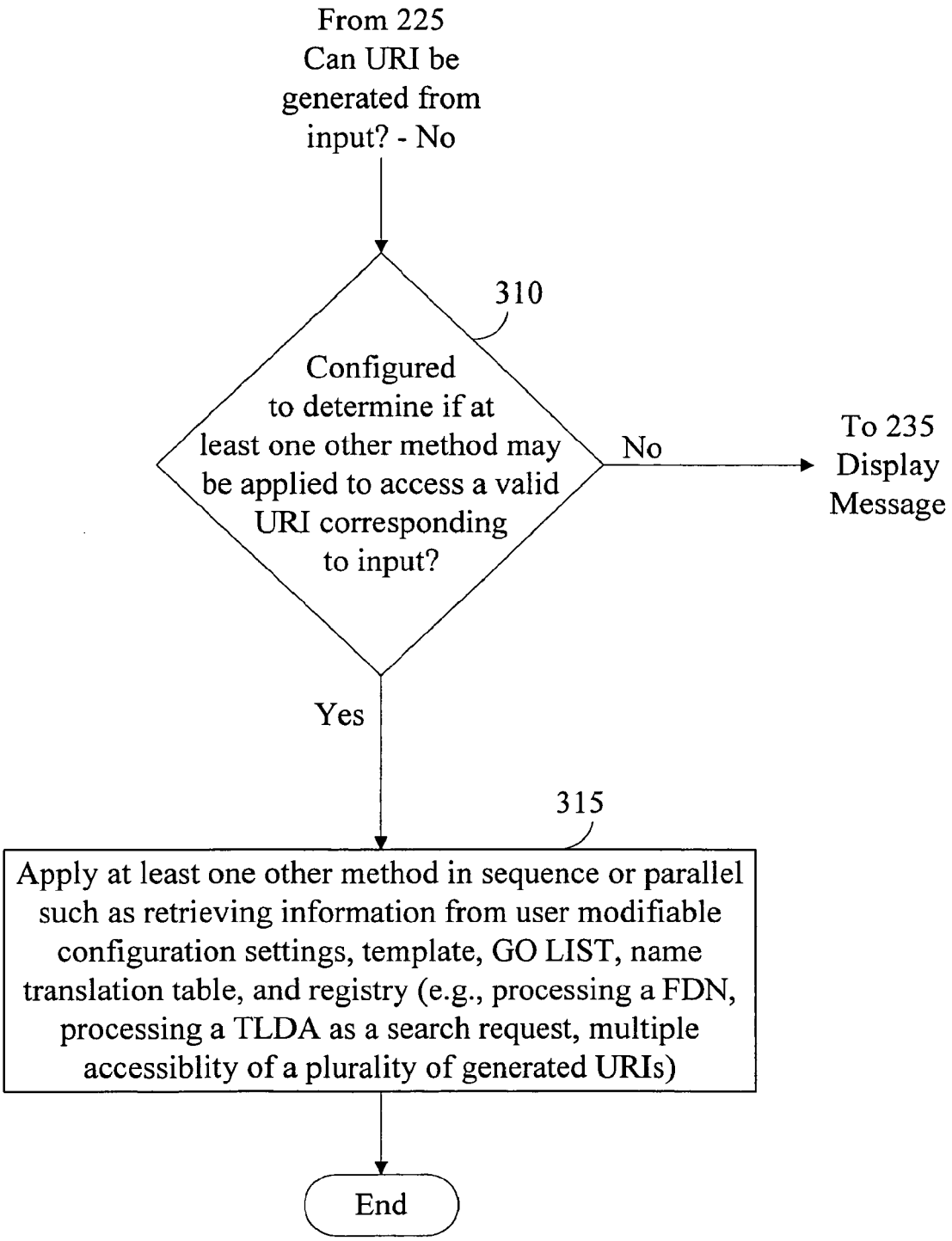
FIG. 3 is a flowchart illustrating the steps performed for generating a valid URI in accordance with the present invention.

FIG. 3 is a flowchart illustrating the steps performed for generating a valid URI. When it is determined in step 225 that a URI can not be generated from the input 210 in accordance with methods known to one of ordinary skill in the art, then it may be determined in step 310 whether it is configured to determine whether other methods may be applied to access a valid URI corresponding to input. If configuration 174 is not enabled, then a message indicating that the URI can not be generated may be displayed in step 235. However, when configuration is enabled, then at least one other method may be applied in step 315 in sequence or parallel including methods explained in U.S. patent application Ser. No. 09/532,500 filed Mar. 21, 2000, by Schneider, entitled "Fictitious domain name method, product, and apparatus" such as retrieving information from user modifiable configuration settings 174, template 184, GO LIST 186, name translation table 188, and registry 178 (e.g., processing a FDN, processing a TLDA as a search request, and multiple accessibility from a plurality of generated URIs, etc.).

Figure 4:
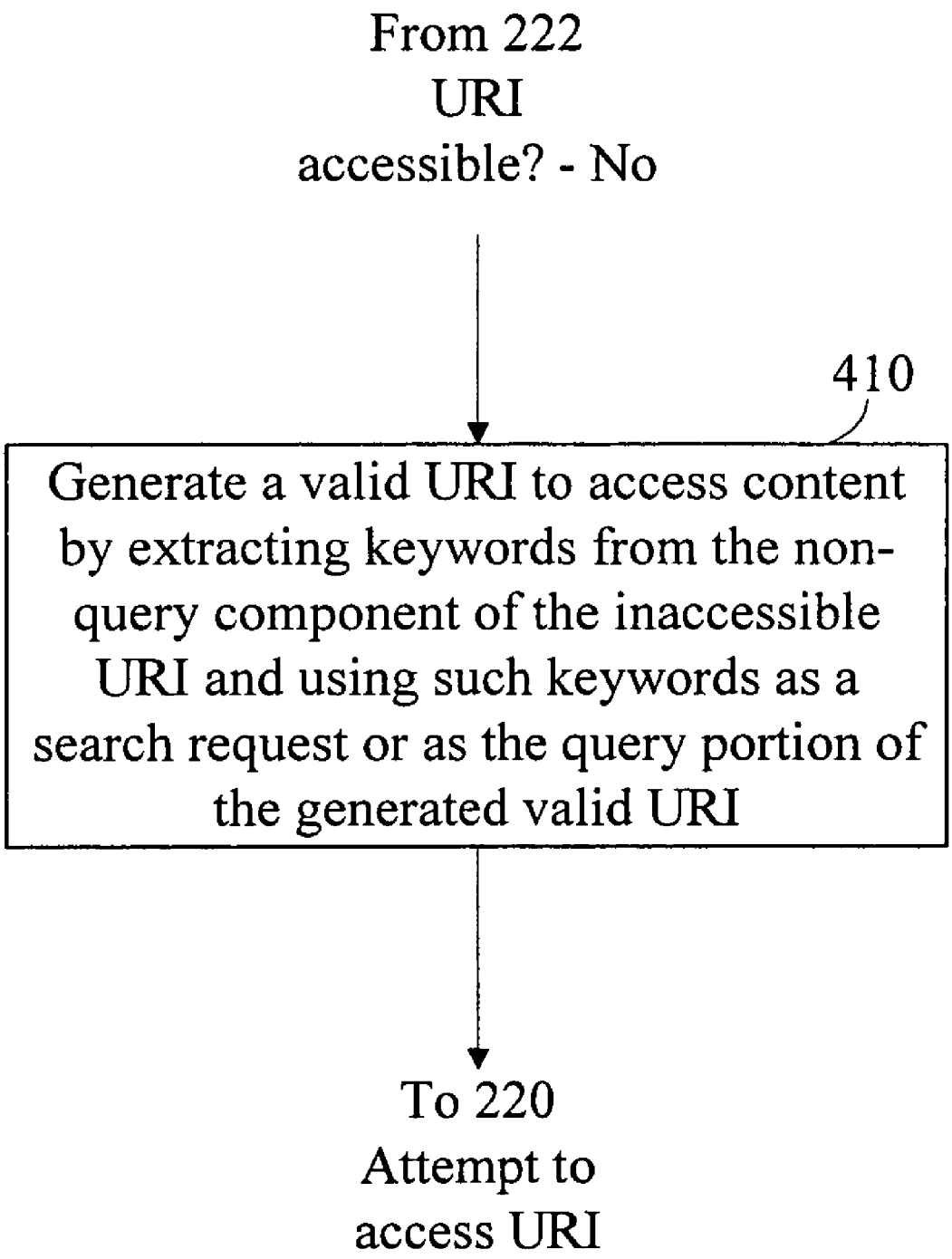
FIG. 4 is a flowchart illustrating the steps performed for generating a valid URI in response to determining that an existing valid URI is inaccessible in accordance with the present invention.

FIG. 4 is a flowchart illustrating the steps performed for generating a valid URI in response to determining that an existing valid URI is inaccessible. When a valid URI is determined in step 222 to be not accessible, then a valid URI may be generated in step 410 to access content by extracting identifiers such as keywords from the non-query component URI (e.g., directory, domain, port, or fragment, etc.) of the inaccessible URI and using such keywords or search terms as a search request or as the query portion of the generated valid URI. After valid URI generation in step 410 an attempt may be made in step 220 to access the URI.

Figure 5A:
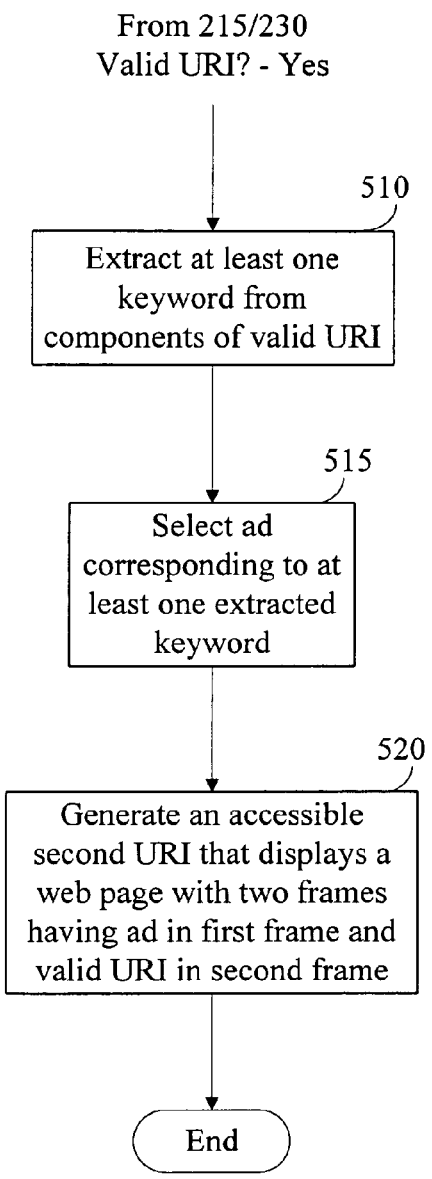
FIG. 5a is a flowchart illustrating the steps performed for generating an accessible second URI that retrieves an advertisement corresponding to components of a first URI in accordance with the present invention.

FIG. 5a is a flowchart illustrating the steps performed for generating an accessible second URI that retrieves an advertisement corresponding to components of a first URI. Upon receiving or generating a valid first URI (step 215 or 230), a script may be executed in step 510 to extract at least one keyword from any URI components and select in step 515 an advertisement from an advertising cache 190 that may correspond to any extracted keywords and/or to other identifiers that are similar to such extracted keywords. An accessible second URI may be generated in step 520 that provides, renders, and/or displays a web page having two frames. The first frame may access the selected ad and the second frame may access the first valid URI.

U.S. Provisional Application Ser. No. 60/143,859 filed Jul. 15, 1999, by Schneider entitled "Method and apparatus for generation, registration, resolution, and emulation of name space", now abandoned, explains how URI components such as scheme, hostname, TLD, port, path, query, or fragment of a URI are regarded as data elements used for generating an accessible URI. All combinations for concatenating component data that does not form a full URI may be referred to as a Partial Uniform Resource Identifier (PURI). The same applies for Partial Uniform Resource Locators (PURLs) and other resource types.

For example, when the input "books.com" is received, the URI "http://books.com" is generated and URI components "http", "books", "com" may be extracted from the CGI script. The word "books" may be used to select an advertisement by consulting a table of advertisements and/or advertising cache 190 relating to the keyword "books". Many advertisers may compete for rotation frequency of their ad per group or category. When an ad is selected, an accessible URI may be generated and when accessed displays the advertisement and web based location field in one frame and display the content of the URI "http://books.com" in the second frame. Another example, is when a TLDA is received as input such as "top-.stories". The URI "http://stories.top.com" may be generated based upon a selected access method (note that a variety of access methods may be used by the present invention to generate different accessible URIs if need be). Keywords extracted from URI are "stories" and "top". A phrase such as "top stories" and "stories top" may also be generated from URI components to more specifically target ad categories for advertisers.

Figure 5B:
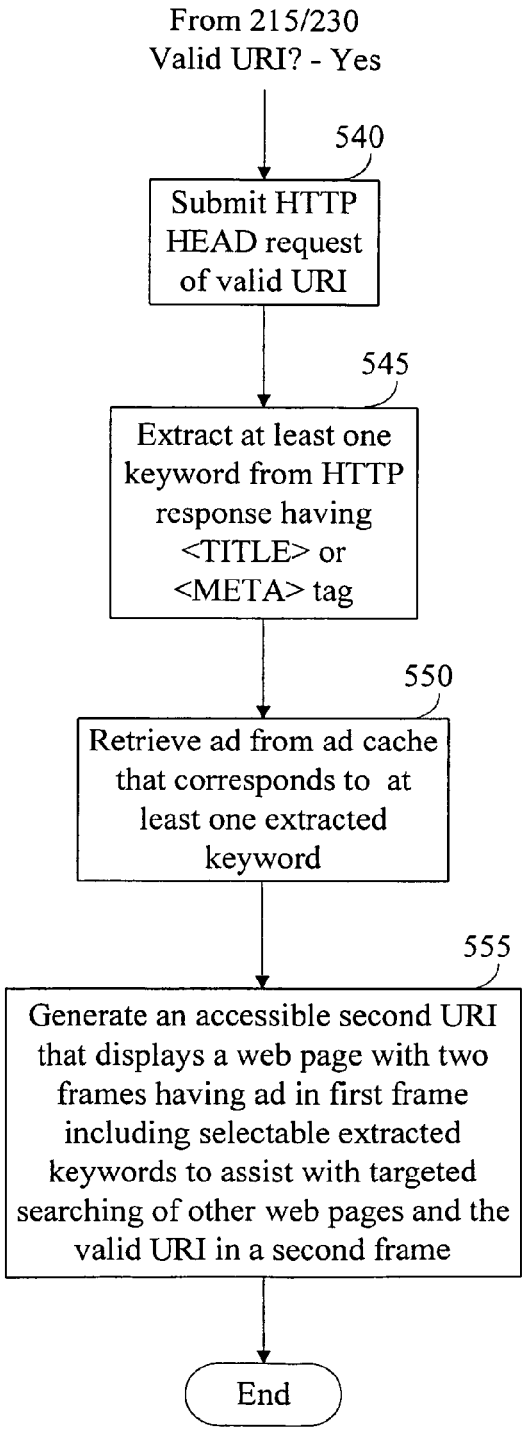
FIG. 5b is a flowchart illustrating the steps performed generating an accessible second URI that retrieves an advertisement corresponding advertisement to meta-information of a first URI in accordance with the present invention.

FIG. 5b is a flowchart illustrating the steps performed generating an accessible second URI that retrieves an advertisement corresponding advertisement to meta-information of a first URI. Upon receiving or generating a valid first URI (step 215 or 230), a script may be executed in step 540 to submit a HTTP HEAD request of the valid URI. When a HTTP response is received then at least one keyword may be extracted in step 545 from the response of the HEAD request from the <TITLE> and/or <META> tag of the target URI.

It may then be determined in step 550 which ad may be selected and retrieved from an ad cache 190 corresponding to at least one extracted keyword. After the ad has been selected, an accessible second URI may then be generated in step 555 that when accessed displays a web page with two frames. An ad may be accessed by the first frame including selectable keywords to assist the user in performing further targeted searching of other search requests, while accessing the first URI in the other frame.

For instance, before the content of URI "http://stories.top-.com" may be displayed as a result of or input "top.stories", while a URI HEAD request further extracts keywords from the <META> tag or the <TITLE> tag from the URI to assist in yet more specific targeted ad rotation. In addition to "top" and "stories", words like "news", "headlines", "weather", "sports", for example, may be extracted from the <META> tag of the URI. These extra keywords may be used to better target ads and also provide suggested categories that may be dynamically generated on the web page for selection to find more content specific to the user. After words have been extracted, the keywords may be used to select an ad from an ad cache the may reside on the client machine and/or locally through an advertising cache 190 stored at the Internet Service Provider (ISP)/Application Service Provider (ASP) or the like. If an ad can not be selected based on this information then keywords may be passed to generate a URI having a query to further assist in ad selection.

The display of suggested search terms or keywords to assist a user in refining a search request is not limited by the components of the URI to extract <META> or <TITLE> tag information from the next web page before displaying the next page. Such keywords may also be selected from any accessed content and/or the page source of the URI. In addition, such keywords may be selected from any URI components. Another preferred implementation is based on a search page as a front end for search engines. To date there is no such program implemented to make use of any tagged language such as HTML, DHTML, XML, XHTML, and SGML to name a few that extracts META information of a subsequent page to be used for extending the range of navigation by concurrently displaying such META information separately from the web page when accessed.

Figure 5C:
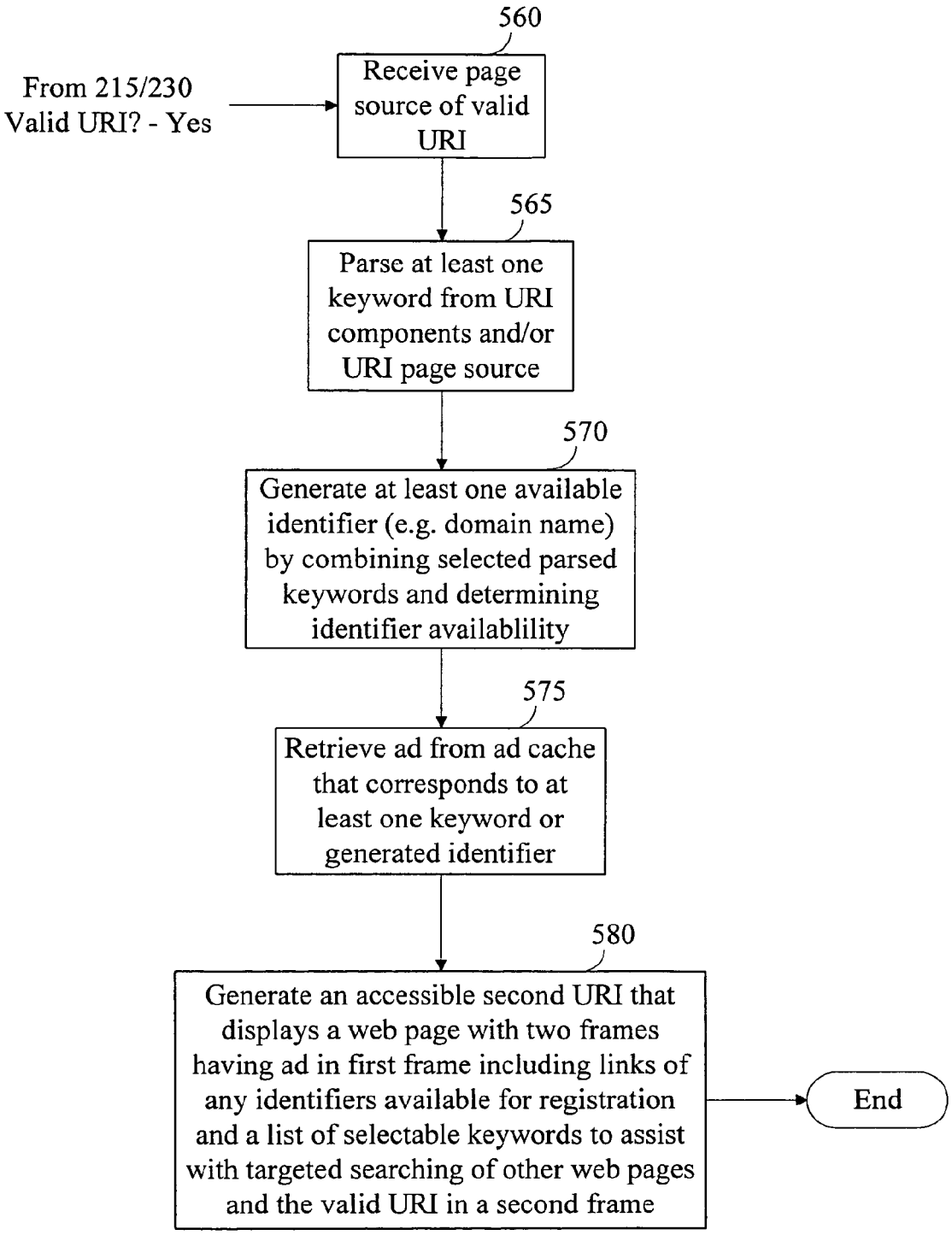
FIG. 5c is a flowchart illustrating the steps performed generating an accessible second URI that may access an advertisement, keywords, and available identifiers corresponding to a first URI in accordance with the present invention.

FIG. 5c is a flowchart illustrating the steps performed generating an accessible second URI that may access an advertisement, keywords, and available identifiers corresponding to a first URI. Upon receiving or generating a valid first URI (step 215 or 230), a script may be executed in step 560 to receive the page source of the first URI. Keywords may then be parsed in step 565 from URI components and/or the page source of the first URI. At least one available identifier (e.g. domain name) may be generated in step 570 by combining selected parsed keywords and determining identifier availability. U.S. patent application Ser. No. 09/598,134 filed Jun. 21, 2000, by Schneider, entitled "Method and apparatus for integrating resolution services, registration services, and search services", explains how identifiers such as domain names may be generated in response to receiving keywords. Combinations of keywords may be concatenated and a TLD added to form a domain name. All generated domain names may then be checked for availability.

Advertisements may be selected in step 575 by retrieving ads from an ad cache that corresponds to at least one keyword or generated identifier. After keyword extraction, identifier generation, and ad selection, an accessible second URI may be generated in step 580 that displays a web page with two frames having the selected ad in the first frame including links of any identifiers available for registration, and a list of selectable keywords to assist with targeted searching of other web pages, while the first URI is accessed in a second frame.

Figure 6:
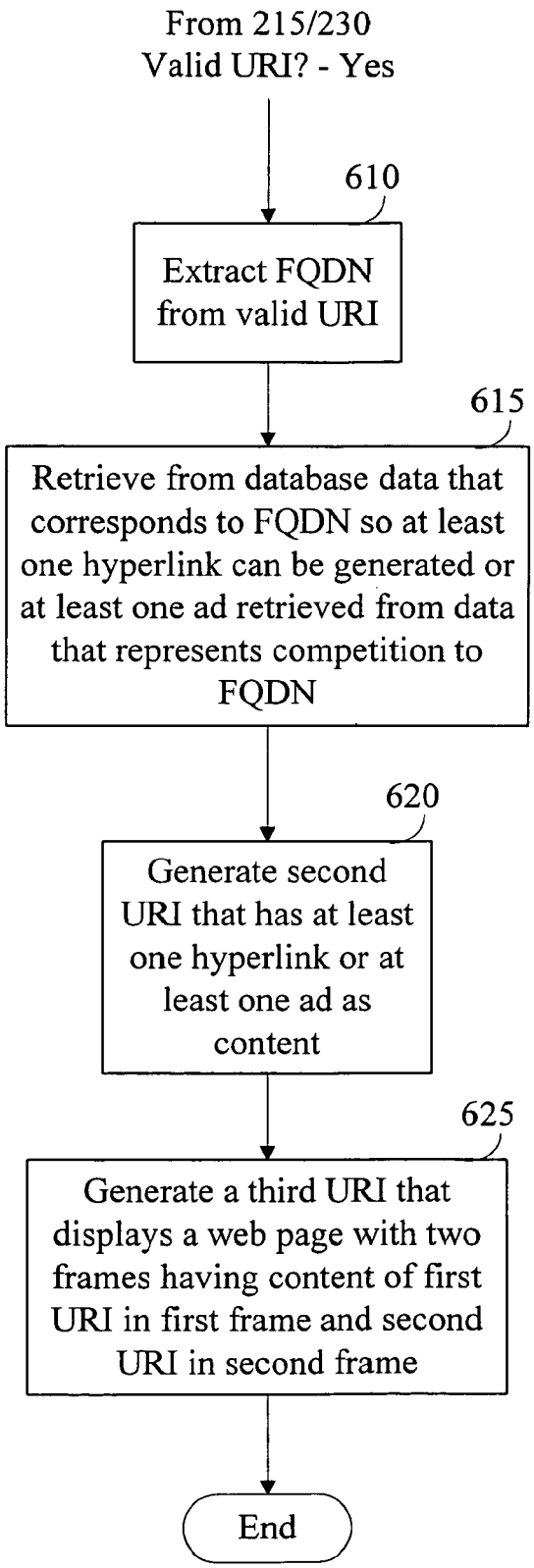
FIG. 6 is a flowchart illustrating the steps performed for extracting a domain or FQDN to determine hyperlinks or advertisements based on competition associated from a generated URI of received input in accordance with the present invention.

FIG. 6 is a flowchart illustrating the steps performed for extracting a domain or FQDN to determine hyperlinks or advertisements based on competition associated from a generated URI of received input. Upon receiving or generating a valid first URI (step 215 or 230), a script may be executed in step 610 to parse a FQDN from the valid URI. Data that corresponds to FQDN may be retrieved in step 615 from an ad database 190 so at least one hyperlink may be generated or at least one ad retrieved from data that represents competition to the FQDN. A second URI may be generated in step 620 that has at least one hyperlink or at least one ad as content. A third URI may be generated in step 625 that displays a web page with two frames having content of the valid URI in the first frame and the second URI in the second frame.

Ads may be targeted by displaying a combination of competitor ads and/or hyperlinks in response to receiving the domain name or FQDN of the URI as input. The selected advertisement may corresponds to competition of an entity that manages the URI. For instance, the URI generated from input is "http://www.burgerking.com" and "burgerking" is extracted and determines that a McDonalds ad, rebate, or coupon may be displayed in conjunction with displaying the "burgerking" website. Links to a "McDonalds" web site may also be provided. Inputting an identifier such as "burgerking.44106" may generate the URI "http://44106.burgerking- .com" and when "44106" is extracted from the identifier, Burger King locations near the zip code "44106" may be displayed in conjunction with the website.

Figure 7:
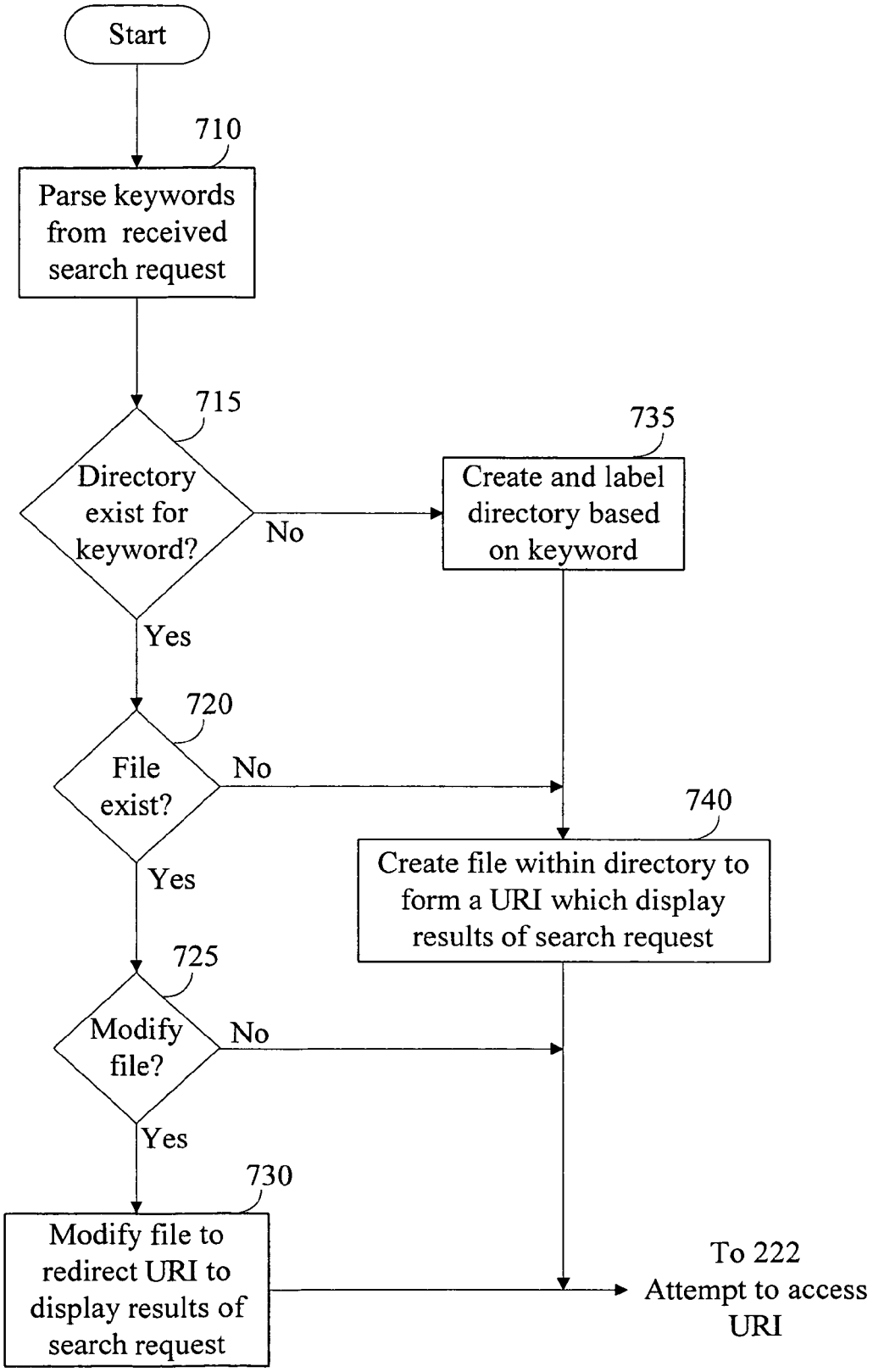
FIG. 7 is a flowchart illustrating the steps performed for generated an accessible URI based upon a search request in accordance with the present invention.

FIG. 7 is a flowchart illustrating the steps performed for generated an accessible URI based upon a search request. When a keyword is parsed in step 710 from a received search request, it then may be determined in step 715 whether a directory exists for the keyword. If the directory exists then it may further be determined in step 720 whether a file exists within the directory. If a file exists then it may be determined in step 725 whether the content of the file requires modification. If modification is needed then the content of the file may be modified in step 730 as necessary. If the directory does not exist then a directory may be created in step 735. When the directory is created or when the directory exists but a file within the directory does not exist, a file within the directory may be created in step 740 forming a URI that accesses results of the search request. When it is determined that the file already exists in step 720 and does not need modification in step 725 or the file is created in step 740 or the existing file is modified in step 735, then an attempt may be made in step 220 to access the URI.

For example, the home page of a website "http://update.to/index.htm" may provide an input text box that is used as a search request front end to pass variables to a CGI script. When the word "news" is entered and submitted as an input search request, the URI "http://update.to/cgi-bin/update.cgi?search=news" is generated. Before accessing the URI a script may be executed to determine whether a directory called "news" exists on the server "update.to". When it is determined that a "news" directory does not exist, then the directory may be created. Furthermore, a file called "index.htm" is created in the "news" directory to generate the URI "http://update.to/news/index.htm". The content of the "index.htm" file may include a URI redirection, a <META> tag refresh, or a <FRAME> tag which may be used to display the content from the URI of the search request "http://update.to/cgi-bin/update.cg i?search=news".

In effect, shorter URLs are generated in real time or on-the-fly when necessary and used as a substitute or proxy for longer URLs. Though any filename may be used, it is a preferred aspect to use "index.htm" as a frame or redirect so the proxy URL is even shorter in string length. A shorter URL makes it easier for a user to remember the URL for future use. The invention is not limited to using only a FLD as a search request. Any directory or combination of directory levels may be either generated on the fly or used as a search request. In addition, to using the directory portion of a URI as a search request, a domain (e.g. SLD, 3LD) or any combination of domain levels may in turn be used to generate a query.

Analysis from major online search engines show that more than 90% of all search requests include three keywords or less. For instance, an accessible URI "http://example.com/coffee/cream/sugar/index.htm" may be generated in response processing the search request "coffee and cream and sugar". In turn, the input "example.com/coffee/cream/sugar" may generate search results in response to processing a web address or URI as a search request. Boolean logic may be applied to extend variations of other search requests. In effect, URI notation may be used as a system to generate a Boolean search request from the URI or vice-versa. For example, the search request "coffee or cream or sugar" may yield "http://example.com/coffee.cream.sugar/index.htm"
whereas the search request "coffee or cream and sugar" may yield "http://example.com/coffee.cream/sugar/index.htm"

Another example for using a URI to reduce user steps is to make use of the correspondence between a HTTP address and an e-mail address. For instance, web pages may be generated such that on each web page there corresponds a hidden variable of an e-mail address as a means to contact the owner of the web page. This is particularly useful when the web page serves as a web based e-mail interface to contact a recipient such as a friend, co-worker, or business entity. For instance, when "http://zipit.to/president" is received as input and accessed, a web page may be displayed allowing anyone viewing the web page to compose an e-mail message without having to enter the e-mail address of the recipient. The burden of remembering or inputting and possibly misspelling the e-mail address of a recipient is eliminated because the hidden variable "mailto:president@zipit.to" is passed as a variable when the e-mail message is sent. After the composed e-mail is submitted from the web page, a lookup table or database may be used to further redirect the e-mail to a final destination designated by the recipient. In effect, e-mail may be delivered by using protocols other than the "mailto:" protocol.

Figure 8:
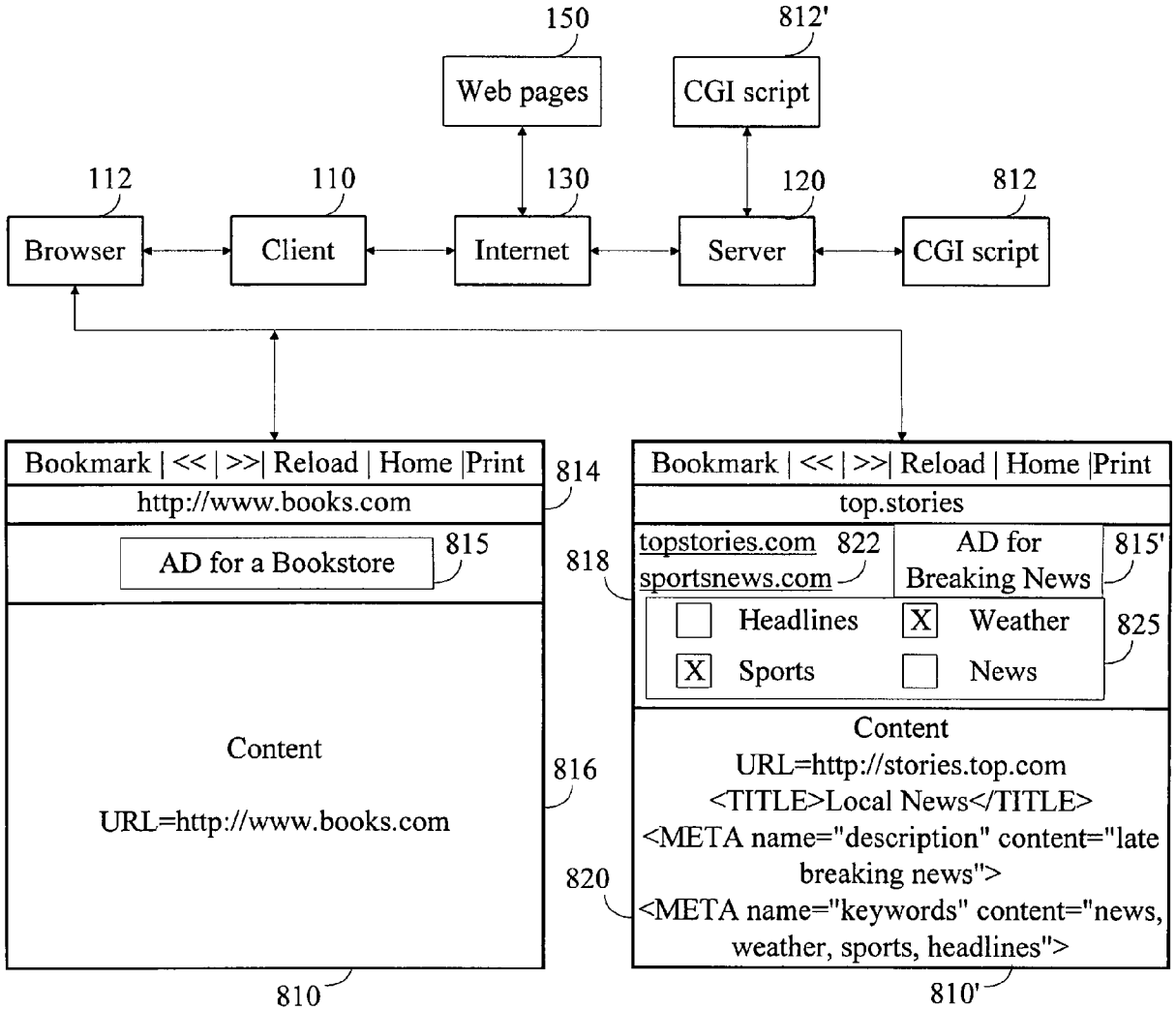
FIG. 8 is a diagram depicting how results may be displayed in a web browser in accordance with the present invention.

FIG. 8 is a diagram depicting how results may be displayed in a web browser in accordance with the present invention. A client 110 web browser 112 having a web page 810 is used to connect to a server 120 via the Internet 130 that executes a CGI script 812. The location field of the web browser 112 is suppressed and the web page 810 displays at least two frames. The first frame is the web based location field 814 including room to rotate advertisements 815 and the second frame 816 may be used to display the content 150 of a web address. An input device 170 (e.g., keyboard, mouse, pen light, touch screen, or microphone etc.) of a client computer or network access apparatus 110 is typically used to receive a web address as input directly from a hyperlink (not shown) in the web page 810, or from the location field 814 of the web page 810.

A HTTP GET request may be generated from input and the browser 112 forwards the request to a server 120, which processes the request by executing a CGI script 812 to extract URI components for ad selection. A first URI 206 may be generated to receive a selected ad 815 for display and refresh the web based location field 814 when accessed by the first frame. The content 150 of the URI generated from the input may be displayed in the second frame 816 of the web page 810 when accessed. The location field 814 of the first frame may either persist by displaying the input or may be cleared out for entry of the next web address. Both the first URI and second URI may be generated as frames and displayed as a web page 810 by the CGI script 812.

Another web page 810' (as discussed in FIG. 5b) having a location field that is suppressed may be displayed by using a different CGI script 812'. The first frame 818 is the web based location field 814 including room to rotate advertisements 815' and display suggested keywords, available domain names 822, or search terms 825 to assist a user in selecting a more specific search.

The second frame 820 may be used to display the content 150 of a web address. A URI GET request may be generated from input, and the browser 112 may forward the request to a server 120, which processes the request by executing a CGI script 812 to determine validity of the input.

An accessible URI is generated from the input and then a URI HEAD request may obtain and extract header information from the accessible URI to determine what advertisement 815' and/or keywords 825 may be generated and displayed in the first frame 818 of the web page 810' whereas the content of the second frame 820 is the content of the URI. Both the first URI and second URI may be generated as frames and displayed as a web page 810' by the CGI script 812'.

Though the above aspects demonstrate how URIs may be accessed based upon a web-based version of a location field, similar teachings may be applied to those skilled in the art by providing a user interface element such as a text box object as input. The text box object may be located anywhere and on any web page including a text box that may be embedded or displayed as part of an on-line advertisement. The text box object may be used in a stand-alone application or stored on magnetic and/or optical media that may be non-volatile, writable, removable, or portable. The text box object may be incorporated as an applet or servlet and embedded in other applications. The text box may be integrated in the taskbar or any part of the GUI's OS, or the OS bypassed and a user interface element overlaid as a graphic on a display device based on modifications to a video card and/or it's associated firmware or software drivers. A command line text box may be further overlaid as an interactive object in other embodiments such as Internet television, cable television, digital television, or interactive television through an Internet appliance or set top box.

Those skilled in the art may make and use software program that functions as a browser plug-in. Such a program may be downloaded and installed for integration into the command line of a device or location field 154 of a browser program 112. Modifying the source code of the browser program 112 itself may be more desirable, in effect, enabling tens of millions of users to take advantage of more creative ways to use input as a means to access a valid URI. In addition, advertising banner ads may be displayed directly as part of the GUI for the client browser 112 rather than limited to web page based banner ad displayed in a frame as discussed in FIG. 8.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A method for a user retrieving a web page from a network comprising:

determining that the web page can be accessed from the network with a resource location request including a Uniform Resource Identifier (URI) having one or more URI components;

generating one or more domain names from at least one of [a] *the* one or more URI components [and] *or* at least a portion of the web page; and, providing the user with the web page from the network and providing the user with an ability to determine whether at least one domain name of [said] *the* one or more domain names is available for registration.

2. The method, as set forth in claim 1, wherein [said] *the* generating said one or more domain names from said at least a portion of the web page includes receiving markup language from the web page, said markup language including head information.

3. The method, as set forth in claim 2, wherein [said] *the* markup language is one of a HTML, DHTML, XML, XHTML, and SGML.

4. The method, as set forth in claim 2, wherein [said] *the* head information includes at least one of a title information and meta information.

5. The method, as set forth in claim 2, wherein [said] *the* receiving [said] *the* markup language from the web page includes retrieving [said] *the* at least a portion of the web page with at least one of a HTTP HEAD request and HTTP GET request.

6. The method, as set forth in claim 1, further including selecting one or more advertisements corresponding to at least one of [a] *the* one or more domain names, *the* one or more URI components, [and] *the* at least a portion of the web page*, or at least one other portion of the web page*.

7. The method, as set forth in claim 6, wherein [said] *the* one or more advertisements is selected from at least one table of advertisements.

8. The method, as set forth in claim 7, wherein [said] *the* at least one table of advertisements is organized by one or more groups and categories.

9. The method, as set forth in claim 7, wherein [said] *the* at least one table of advertisements can be accessed from an advertisement cache.

10. The method, as set forth in claim 6, wherein a first entity manages the web page and [said] *the* one or more advertisements correspond to a second entity that represents business competition to [said] *the* first entity.

11. The method, as set forth in claim 1, wherein [said] *the* at least one domain name is generated from at least one keyword extracted from [said] *the* at least one of [a] *the* one or more URI components [and] *or the* at least a portion of the web page.

12. The method, as set forth in claim 1, further including generating one or more keywords and search terms used to assist the user with performing an internet search engine request corresponding to at least one of [a] *the* one or more domain names, *the* one or more URI components, [and] *the* at least a portion of the web page*, or at least one other portion of the web page*.

13. The method, as set forth in claim 12, further including providing the user with an ability to request an internet search engine request from [said] *the* one of a one or more keywords and search terms.

14. A *non-transitory* computer program product comprising computer readable program code stored on a computer readable medium, the program code adapted to execute a method for a user requesting a web page from a network including determining that the web page can be accessed from the network with a resource location request including a Uniform Resource Identifier (URI) having at least one URI component, generating one or more domain names from at least one of [a] *the* one or more URI components [and] *or* at least a portion of the web page, and providing the user with the web page from the network and providing the user with an ability to determine whether at least one domain name of [said] *the* one or more domain names is available for registration.

15. A method for a user requesting a web page from a network comprising:

determining that the web page can be accessed from the network with a resource location request including a *first* Uniform Resource Identifier (URI) having one or more URI components;

*parsing at least one keyword from the one or more URI components;* at least one of [a] generating one or more domain names [from said one or more URI components and] *for registration using the at least one keyword or* selecting one or more advertisements [from said one or more URI components] *using the at least one keyword*; [and,]

*wherein generating one or more domain names comprises concatenating the at least one keyword and adding a Top Level Domain (TLD) suffix;*

*wherein selecting one or more advertisements comprises selecting one or more advertisements that correspond to the at least one keyword from at least one table of advertisements;*

[providing the user with] *generating a second URI that provides* the web page from the network and [providing the user with] *provides* an ability to at least one of [a] determine whether at least one domain name of [said] *the* one or more domain names is available for registration [and] *or* view at least one advertisement of [said] *the* one or more advertisements*; and*

*providing the second URL.*

[16. The method, as set forth in claim 15, wherein said one or more advertisements is selected from at least one table of advertisements.]

17. The method, as set forth in claim 15, wherein [said] *the* at least one table of advertisements is organized by one or more groups and categories.

18. The method, as set forth in claim [16] *15*, wherein [said] *the* at least one table of advertisements can be accessed from an advertisement cache.

19. The method, as set forth in claim [16] *15*, wherein a first entity manages the web page and [said] *the* one or more advertisements correspond to a second entity that represents business competition to said first entity.

[20. The method, as set forth in claim 15, wherein said one or more domain names are generated from at least one keyword extracted from said one or more URI components.]

*21. A method comprising:*

*determining by a computing device in communication with a network whether a web page can be accessed from the network using a resource location request including a Uniform Resource Identifier (URI) including a first domain name;*

*parsing at least one keyword from the URI or, in response to determining that the web page can be accessed, at least a portion of the web page;*

*generating by the computing device at least one generated domain name for registration from the at least one keyword;*

*wherein generating the at least one generated domain name comprises the computing device concatenating the at least one keyword and the computing device selecting and adding a Top Level Domain (TLD) suffix;*

*wherein the at least one generated domain name is distinguishable from the first domain name; and*

*the computing device providing one of the at least one generated domain name or, in response to determining that the web page can be accessed, the at least one generated domain name and the web page from the network.*

*22. The method, as set forth in claim 21, wherein parsing the at least one keyword from the at least a portion of the web page comprises receiving markup language from the web page, the markup language including head information.*

*23. The method, as set forth in claim 22, wherein the markup language is one of HTML, DHTML, XML, XHTML, or SGML.*

*24. The method, as set forth in claim 22, wherein the head information comprises at least one of title information or meta information.*

*25. The method, as set forth in claim 22, wherein the receiving the markup language from the web page comprises retrieving the at least a portion of the web page with at least one of a HTTP HEAD request or HTTP GET request.*

*26. The method, as set forth in claim 21, further comprising selecting one or more advertisements corresponding to at least one of the at least one generated domain name or the at least one keyword.*

*27. The method, as set forth in claim 26, wherein the one or more advertisements is selected from at least one table of advertisements.*

*28. The method, as set forth in claim 27, wherein the at least one table of advertisements is organized by at least one of at least one group or at least one category.*

*29. The method, as set forth in claim 27, wherein the at least one table of advertisements is accessed from a cache.*

*30. The method, as set forth in claim 26, wherein the web page is associated with a first entity and the one or more advertisements are associated with a second entity that represents business competition to the first entity.*

*31. The method, as set forth in claim 21, further comprising generating at least one search term wherein the at least one search term is associated with at least one of the at least one generated domain name or the at least one keyword.*

*32. The method, as set forth in claim 31, further comprising generating an internet search engine request from the at least one of at least one keyword or at least one search term.*

*33. The method, as set forth in claim 21, wherein the step of generating by the computing device at least one generated domain name comprises generating at least one generated domain name that is available for registration.*

*34. The method, as set forth in claim 33, wherein the step of generating by the computing device at least one generated domain name further comprises determining that the at least one generated domain name is available for registration.*

*35. A non-transitory computer readable medium having instructions stored thereon that, if executed by a computing device, cause the computing device to perform operations comprising:*

*determining whether a web page can be accessed from a network using a resource location request including a Uniform Resource Identifier (URI) including a first domain name;*

*parsing at least one keyword from the URI or, in response to determining that the web page can be accessed, at least a portion of the web page;*

*generating at least one generated domain name for registration from the at least one keyword;*

*wherein generating the at least one generated domain name comprises concatenating the at least one keyword and selecting and adding a Top Level Domain (TLD) suffix;*

*wherein the at least one generated domain name is distinguishable from the first domain name; and*

*providing one of the at least one generated domain names or, in response to determining that the web page can be accessed, the at least one generated domain name and the web page from the network.*

*36. A method comprising:*

*parsing by a computing device in communication with a network at least one keyword from an accessible first Uniform Resource Identifier (URI) comprising a resource location request;*

*selecting at least one advertisement that corresponds to the at least one keyword;*

*generating a second URI that effects provision of at least one of the at least one advertisement to a user; and*

*providing the second URI.*

*37. The method, as set forth in claim 36, wherein the first URI identifies at least one resource that is associated with a first entity and the at least one advertisement is associated with a second entity that represents business competition to the first entity.*

*38. The method as set forth in claim 36 further comprising determining by the computing device that at least one resource can be accessed using the first URI.*

*39. The method as set forth in claim 36 wherein generating the second URI that effects provision of at least one of the at least one advertisement to a user further comprises generating the second URI wherein the second URI at least one of effects provision of at least one of the at least one advertisement to a user or effects provision of at least one resource accessible with the first URI to the user and effects provision of at least one of the at least one advertisement to the user.*

*40. The method as set forth in claim 36 wherein parsing the at least one keyword from the first URI further comprises parsing the at least one keyword from the first URI and at least a portion of at least one resource accessible with the first URI.*

*41. The method as set forth in claim 36 wherein the selecting the at least one advertisement further comprises selecting the at least one advertisement from a table.*

*42. The method, as set forth in claim 41, wherein the at least one table of advertisements can be accessed from a cache.*

*43. The method as set forth in claim 41 wherein the table is organized by at least one of at least one group or at least one category.*

*44. The method as set forth in claim 36 further comprising generating one or more search terms to assist the user with performing an internet search engine request corresponding to at least one of the at least one advertisement, a portion of the URI, or at least a portion of at least one resource accessible with the first URI.*

*45. The method as set forth in claim 44 further comprising providing the user with an ability to request an internet search engine request from at least one of the one or more search terms.*

*46. The method as set forth in claim 36 wherein the providing the second URI further comprises suppressing a location field of a client browser.*

*47. The method as set forth in claim 36 wherein the generating the second URI further comprises generating the second URI wherein the second URI also effects provision of at least one hyperlink relating to the at least one advertisement to the user.*

*48. The method as set forth in claim 36 wherein the first URI accesses at least a first resource, and wherein the second URI identifies a second resource having at least two frames, at least one frame linking the first resource and at least one other frame linking to the at least one advertisement.*

*49. An apparatus comprising:*

*at least one interface adapted to receive a resource location request, the resource location request comprising a Uniform Resource Identifier (URI) including a first domain name;*

*at least one computing device in communication with the at least one interface and a network, the at least one computing device adapted to:*

*determine whether a web page can be accessed from the network using the resource location request;*

*parse at least one keyword from the URI or, in response to determining that the web page can be accessed, at least a portion of the web page;*

*generate at least one generated domain name for registration from the at least one keyword;*

*wherein generating the at least one generated domain name concatenating the at least one keyword and selecting and adding a Top Level Domain (TLD) suffix;*

*wherein the at least one generated domain name is distinguishable from the first domain name; and*

*provide one of the at least one generated domain name or, in response to determining that the web page can be accessed, the at least one generated domain name and the web page from the network.*

*50. An apparatus comprising:*

*at least one interface adapted to receive a resource location request, the resource location request comprising an accessible first Uniform Resource Identifier (URI);*

*at least one computing device in communication with the at least one interface and a network, the at least one computing device adapted to:*

*parse at least one keyword from the first URI or at least a portion of at least one network resource accessible using the first URI;*

*select at least one advertisement that corresponds to the at least one keyword;*

*generate a second URI that effects provision of the at least one advertisement to a user or effects provision of the at least one network resource to the user and effects provision of the at least one advertisement to the user; and*

*provide the second URI.*

*51. The apparatus as set forth in claim 50 wherein the at least one computing device is further adapted to determine that the at least one network resource can be accessed using the first URI.*

*52. The apparatus as set forth in claim 50 wherein the at least one computing device is further adapted to select the at least one advertisement that corresponds to the at least one keyword from at least one table of advertisements.*

*53. The apparatus as set forth in claim 52 wherein the at least one table of advertisements is organized by at least one of at least one group or at least one category.*

*54. The apparatus as set forth in claim 52 wherein the at least one computing device is further adapted to access the at least one table of advertisements from a cache.*

*55. The apparatus as set forth in claim 50 wherein the at least one network resource is associated with a first entity and the at least one advertisement is associated with a second entity that represents business competition to the first entity.*

*56. The apparatus as set forth in claim 50 wherein the computing device is further adapted to generate one or more search terms used to assist the user with performing an internet search engine request corresponding to at least one of the at least one advertisement, a portion of the URI, the at least a*

*portion of the at least one network resource, or at least one other portion of the at least one network resource.*

*57. The apparatus as set forth in claim 56 wherein the computing device is further adapted to provide the user with an ability to request an internet search engine request from at least one of the one or more search terms.*

*58. The apparatus as set forth in claim 50 wherein the computing device is further adapted to suppress a location field of a browser.*

*59. The apparatus as set forth in claim 50 wherein the computing device is further adapted to generate the second URI wherein the second URI also effects provision of at least one hyperlink relating to the at least one advertisement to the user.*

*60. The apparatus as set forth in claim 50 wherein the computing device is further adapted to generate the second URI wherein the second URI identifies a second network resource having at least two frames, at least one frame linking to the first at least one network resource and at least one other frame linking to the at least one advertisement.*

*61. A non-transitory tangible computer readable medium having instructions stored thereon, the instructions comprising:*

*instructions for parsing by a computing device in communication with a network at least one keyword from an accessible first Uniform Resource Identifier (URI) comprising a resource location request;*

*instructions for selecting at least one advertisement that corresponds to the at least one keyword;*

*instructions for generating a second URI that effects provision of at least one of the at least one advertisement to a user; and*

*instructions for providing the second URI.*

*62. The non-transitory tangible computer readable medium as set forth in claim 61 wherein the instructions further comprise instructions for determining by the computing device that at least one resource can be accessed using the first URI.*

*63. The non-transitory tangible computer readable medium as set forth in claim 61 wherein generating the second URI that effects provision of at least one of the at least one advertisement to a user further comprises generating the second URI wherein the second URI at least one of effects provision of at least one of the at least one advertisement to a user or effects provision of at least one resource accessible with the first URI to the user and effects provision of at least one of the at least one advertisement to the user.*

*64. The non-transitory tangible computer readable medium as set forth in claim 61 wherein parsing the at least one keyword from the first URI further comprises parsing the at least one keyword from the first URI and at least a portion of at least one resource accessible with the first URI.*

*65. The non-transitory tangible computer readable medium as set forth in claim 61 wherein the selecting the at least one advertisement further comprises selecting the at least one advertisement from a table.*

*66. The non-transitory tangible computer readable medium as set forth in claim 65 wherein the table is organized by at least one of at least one group or at least one category.*

*67. The non-transitory tangible computer readable medium as set forth in claim 65 wherein the at least one table of advertisements can be accessed from a cache.*

*68. The non-transitory tangible computer readable medium as set forth in claim 61 wherein the first URI identifies at least one resource that is associated with a first entity and the at least one advertisement is associated with a second entity that represents business competition to the first entity.*

*69. The non-transitory tangible computer readable medium as set forth in claim 61 wherein the instructions further comprise generating one or more search terms to assist the user with performing an internet search engine request corresponding to at least one of the at least one advertisement, a portion of the URI, or at least a portion of at least one resource accessible with the first URI.*

*70. The non-transitory tangible computer readable medium as set forth in claim 69 wherein the instructions further comprise providing the user with an ability to request an internet search engine request from at least one of the one or more search terms.*

*71. The non-transitory tangible computer readable medium as set forth in claim 61 wherein the providing the second URI further comprises suppressing a location field of a client browser.*

*72. The non-transitory tangible computer readable medium as set forth in claim 61 wherein the generating the second URI further comprises generating the second URI wherein the second URI also effects provision of at least one hyperlink relating to the at least one advertisement to the user.*

*73. The non-transitory tangible computer readable medium as set forth in claim 61 wherein the first URI accesses at least a first resource, and wherein the second URI identifies a second resource having at least two frames, at least one frame linking the first resource and at least one other frame linking to the at least one advertisement.*

* * * * *